(12) United States Patent
Umezawa et al.

(10) Patent No.: US 7,975,645 B2
(45) Date of Patent: Jul. 12, 2011

(54) PAINT COATING SYSTEM

(75) Inventors: Tokuo Umezawa, Yokohama (JP); Hidetsugu Matsuda, Minamimuro-gun (JP); Masaharu Kuromoto, Yokohama (JP); Yutaka Sakata, Takasaki (JP)

(73) Assignee: ABB K.K., Tokyo (JP)

( * ) Notice: Subject to any disclaimer, the term of this patent is extended or adjusted under 35 U.S.C. 154(b) by 405 days.

(21) Appl. No.: 12/161,249

(22) PCT Filed: Feb. 6, 2007

(86) PCT No.: PCT/JP2007/052437
§ 371 (c)(1),
(2), (4) Date: Jul. 17, 2008

(87) PCT Pub. No.: WO2008/096453
PCT Pub. Date: Aug. 14, 2008

(65) Prior Publication Data
US 2010/0230511 A1 Sep. 16, 2010

(51) Int. Cl.
*B05B 15/02* (2006.01)
*B05B 3/00* (2006.01)
*B05B 5/00* (2006.01)
*A62C 31/00* (2006.01)

(52) U.S. Cl. ........ 118/302; 118/323; 239/104; 239/305; 222/325; 222/326; 222/148

(58) Field of Classification Search ........... 118/323, 118/321, 300, 302; 239/223, 305, 750, 104, 239/106, 120, 121; 427/426, 427.3, 427.2; 222/325, 148, 326, 327; 901/43; 141/20.5
See application file for complete search history.

(56) References Cited

U.S. PATENT DOCUMENTS

| | | | |
|---|---|---|---|
| 6,458,424 B1 | 10/2002 | Yoshida et al. | |
| 6,533,861 B1 | 3/2003 | Matsuda et al. | |
| 2001/0016545 A1 | 8/2001 | Jeong | |
| 2002/0043567 A1 | 4/2002 | Provenaz et al. | |
| 2005/0076832 A1 | 4/2005 | Nakane | |

FOREIGN PATENT DOCUMENTS

| | | |
|---|---|---|
| JP | 2000 176333 | 6/2000 |
| JP | 2001 79463 | 3/2001 |
| JP | 2001 225290 | 8/2001 |
| JP | 2002 113400 | 4/2002 |
| JP | 2005 87811 | 4/2005 |
| JP | 2006 150544 | 6/2006 |

OTHER PUBLICATIONS

U.S. Appl. No. 12/161,249, filed Jul. 17, 2008, Umezawa, et al.
U.S. Appl. No. 12/375,279, filed Jan. 27, 2009, Umezawa, et al.

*Primary Examiner* — Yewebdar T Tadesse
(74) *Attorney, Agent, or Firm* — Oblon, Spivak, McClelland, Maier & Neustadt, L.L.P.

(57) ABSTRACT

A common body (15) of a coater unit (14) is mounted on a robot device (13). A common body gripper (33) is fixedly mounted on a fixed plate (32) of an atomizing head changing and washing device (31). At the time of replacing a used atomizing head (19') and a used paint cartridge (24') by a washed atomizing head (19) and a replenished paint cartridge (24), respectively, the common body (15) is gripped and located in a predetermined position by the common body gripper (33). When the common body (15) is gripped by the common body gripper (33), the robot device (13) is put in a reduced power mode attenuating driving forces to leave said common body (15) in a freely movable state by application of an external force.

10 Claims, 34 Drawing Sheets

PAINT COATING SYSTEM

TECHNICAL FIELD

This invention relates to a paint coating system particularly suitable for use, for example, in coating vehicle bodies, furniture, electric appliances and the like.

BACKGROUND ART

Generally, paint coating systems in use for painting vehicle bodies and the like are largely constituted by a robot device with an articulated arm, and a coater unit mounted on a distal end of the robot arm of the robot device and provided with an atomizing head for spraying atomized paint particles.

Among paint coating systems of this sort, there is a system providing a plural number of atomizing heads which can be replaceably attached to a common body which is mounted on a distal end of a robot arm of the robot device (see, for example, Patent Literature 1: Japanese Patent Laid-Open No. 2001-79463). In another paint coating system, paint cartridges filled with paint, which is supplied for atomizing heads, are interchangeably attached to the common body (see, for example, Patent Literature 2: Japanese Patent Laid-Open No. 2000-176333).

When replacing an atomizing head on a common body of a coater unit, a robot arm of the robot device operates to attach an atomizing head on the common body to an atomizing head gripper of an atomizing head changing and washing device. In this state, the common body is lifted up by the robot device to detach the used atomizing head from the common body. On the other hand, after detachment of the used atomizing head, the common body is transferred by a robot device to an atomizing head changing position for replacement by a washed atomizing head which is held on an atomizing head gripper.

Further, when replacing paint cartridges on a common body of a coater unit, the coater unit is transferred to and located in a predetermined cartridge changing position by a robot arm of a robot device, and the action of the robot arm is stopped there. In this state, a used paint cartridge is detached from the common body by a cartridge changer, which is moved upward after gripping the used paint cartridge by a cartridge gripper. In the meantime, the robot device is stopped at the predetermined cartridge changing position while another paint cartridge, which has been replenished with paint, is mounted on the common body from above by the cartridge changer.

In this connection, in the case of the paint coating system of Patent Literature 1, an atomizing head is replaced by moving a coater unit up and down relative to an atomizing head gripper which is held in a fixed state.

On the other hand, in the case of the paint coating system of Patent Literature 2, a robot arm of a robot device is stopped at a predetermined cartridge changing position to locate and set a coater unit in that position while a paint cartridge is replaced by a cartridge changer.

However, in the case of a robot device which is in use for paint coating operations, with regard to the repeated positioning accuracy in motion control such as moving, stopping, posture and the like of a coater unit which is mounted on a distal end of a robot arm, there is inevitably an error of several millimeters. Therefore, even if the coater unit is moved to a predetermined position for changing an atomizing head or a paint cartridge in response to the same control command after finishing a certain coating operation by the robot device, actually it is often the case that the coater unit is located in a position which is somewhat deviated from the predetermined changing position. Therefore, if the changing operation is carried out depending upon the accuracy of motion control on the part of the robot device alone, this deviation from the predetermined changing position may result in exertion of a forcible load between a common body and the atomizing head or the paint cartridge, shortening the service life of the coater unit by repeated abrasive and damaging contact.

Besides, a robot device is required to be operative with an extremely high degree of accuracy in locating a coater unit in a predetermined changing position at the time of changing a paint cartridge, and, in order to meet this requirement, needs to be installed with high dimensional accuracy despite a considerable increase in cost.

DISCLOSURE OF THE INVENTION

In view of the above-discussed problems with the prior art, it is an object of the present invention to provide a paint coating system which is arranged to grip a common body of a coater unit on a robot device at a predetermined specific position to permit smooth replacement of an atomizing head and a paint cartridge.

It is another object of the present invention to provide a paint coating system which is arranged to put a robot device in a reduced power mode at the time of gripping a common body of a coater unit, and thereby permitting to set the common body accurately at a predetermined changing position.

(1) A paint coating system according to the present invention is composed of: a robot device operative to take coating actions; a coater unit having a common body fixedly mounted on the robot device and an atomizing head replaceably attached to the common body for spraying atomized paint particles; a paint cartridge replaceably attached to the common body of the coater unit to supply paint to the atomizing head; an atomizing head changing and washing device adapted to replace a used atomizing head on the common body of the coater unit by a washed clean atomizing head and to wash the dismantled used atomizing head clean; and a cartridge changer adapted to pick up a selected paint cartridge among a plural number of replenished paint cartridges arrayed on a mount deck, and to replace a used paint cartridge on the common body of the coater unit in a changing position of the atomizing head changing and washing device by the selected paint cartridge.

In order to achieve the above-stated objectives, a paint coating system according to the present invention comprises: a common body gripper adapted to grip the common body of the coater unit, after a transfer by the robot device to the changing position of the atomizing head changing and washing device, and to locate the common body exactly at the changing position.

With the arrangements just described, the coater unit is transferred to the changing position of the atomizing head changing and washing device by the robot device at the time of replacing the atomizing head and the paint cartridge on the common body of the coater unit. The common body of the coater unit is gripped by the common body gripper which is provided at the changing position. Therefore, a positional deviation, which is attributable to an error in repeated positioning accuracy of the robot device or an error in installation of the robot device, is absorbed, and the common body of the coater unit is exactly located in the changing position of the atomizing head changing and washing device.

As a consequence, the atomizing head as well as the paint cartridge on the common body can be attached or detached quite smoothly in such away as to prolong their service life.

Besides, it becomes possible to improve the work for installation of the robot device as well as machining operations and installation of the atomizing head changing and washing device and the paint cartridge changer. Furthermore, it becomes possible to cut the cost of a paint coating system as a whole.

(2) According to the present invention, preferably the common body gripper is fixedly mounted on the atomizing head changing and washing device, at a position where the common body of the coater unit on the robot device is grippingly catchable.

In this case, the common body gripper is located in a position where it can grip the common body of the coater unit on the robot device, in other words, in a position within an operative range of the robot device. That is to say, the coater unit can be transferred to and located in a changing position by the robot device. At this time, by a gripping action of the common body gripper which is fixedly mounted on the atomizing head changing and washing device, the common body of the coater unit on the robot device is fixedly located in the changing position.

(3) According to the present invention, preferably the atomizing head changing and washing device is composed of a fixed member located adjacently to the cartridge changer, the common body gripper mounted on the fixed member and adapted to grip the common body at the changing position, an atomizing head gripper located under the common body gripper movably in both vertical and lateral directions and adapted to attach or detach the atomizing head, and washers provided movably in a vertical direction at one side of the common body gripper to wash clean the used atomizing head gripped on the atomizing head gripper.

In this case, the common body of the coater unit is located exactly in the changing position by a gripping action of the common body gripper which is fixedly mounted on the fixed member. Therefore, the atomizing head, which is gripped by the atomizing head gripper, can be attached to or detached from the common body by vertically moving the atomizing head gripper up and down. Further, by moving the atomizing head gripper in a rightward or leftward direction, a used atomizing head can be located at one side of the common body gripper to wash the used atomizing head by means of the washer.

(4) According to the present invention, preferably the atomizing head gripper and the washers are moved up and down together by means of an elevator provided on the fixed member.

In this case, an atomizing head which is gripped on the atomizing head gripper can be attached to or detached from the common body by moving the atomizing head gripper and the washer up and down on the elevator, which is located on the fixed member. Besides, the washer can be moved to an atomizing head washing position.

(5) According to the present invention, the robot device is controlled in a reduced power mode in driving force at the time when the common body of the coater unit is gripped by the common body gripper, setting the common body in a free state.

In this case, at the time when the common body of the coater unit is gripped by the common body gripper, the robot device is switched to a reduced power mode, lowering driving forces of the robot device to a minimum necessary level for maintaining a required posture. As a result, the common body is virtually set in a free state and can be moved freely without disturbed by a robot device. Thus, even if there is a positional deviation between the robot device and the common body gripper, the common body of the coater unit can be accurately located and fixed in a changing position by the common body gripper which is arranged to modify a positional deviation of the coating unit if any.

(6) According to the present invention, the common body of the coater unit is provided with grip portions to be used in adjusting a position in a radial direction, while the common body gripper is arranged to adjust the common body in a rotational direction by engagement with the grip portions at the time of gripping the common body.

With the arrangements just described, the common body gripper can orient the common body to a correct position in the radial direction by engagement with the grip portions of the common body at the time of gripping the common body of the coater unit. Therefore, by the common body gripper, the common body is located accurately in a specific changing position in a correctly oriented state.

(7) According to the present invention, preferably the cartridge changer comprises a swing arm adapted to replace the paint cartridges while swinging arcuately about a swing arm pivoting point to and from a mount deck holding an array of the replenished paint cartridges and the changing position of the atomizing head changing and washing device.

In this case, the cartridge changer can replace replenished paint cartridge on the mount deck with used paint cartridge of the coater unit which is located on the changing position of the atomizing head changing and washing device by an arcuate swinging motion of the swing arm on a pivoting point. A plural number of replenished paint cartridges on the mount deck can be replaced simply by arcuate swinging motions of the swing arm.

(8) According to the present invention, preferably the cartridge changer is composed of the mount deck adapted to mount the replenished paint cartridges located in arcuate rows about the swing arm pivoting point, an arcuate moving portion provided on the mount deck and circulated to and fro about the pivoting point, a vertical moving portion provided on the arcuate moving portion for vertical upward and downward movements, and the swing arm, which extends in a horizontal plane attached to the vertical moving portion at a base end and provided with cartridge grippers at and on a fore free end thereof.

With the arrangements just described, a replenished paint cartridge is gripped in a cartridge gripper, which is provided at a fore distal end of the swing arm, and then the cartridge gripper is lifted up by the vertical moving portion together with the replenished paint cartridge. The cartridge gripper is then moved along arcuate row on the swing arm pivoting point by the arcuate moving portion. Thus, the cartridge changer is capable of dismantling a used paint cartridge from the common body of the coater unit which is fixedly retained at the changing position of the atomizing head changing and washing device, or mounting a replenished paint cartridge.

BEST MODE FOR CARRYING OUT THE INVENTION

Hereafter, with reference to FIGS. 1 through 40, the paint coating system of the present invention is described more particularly by way of its preferred embodiment which is applied as a vehicle body painting system, for example.

Figure 1:
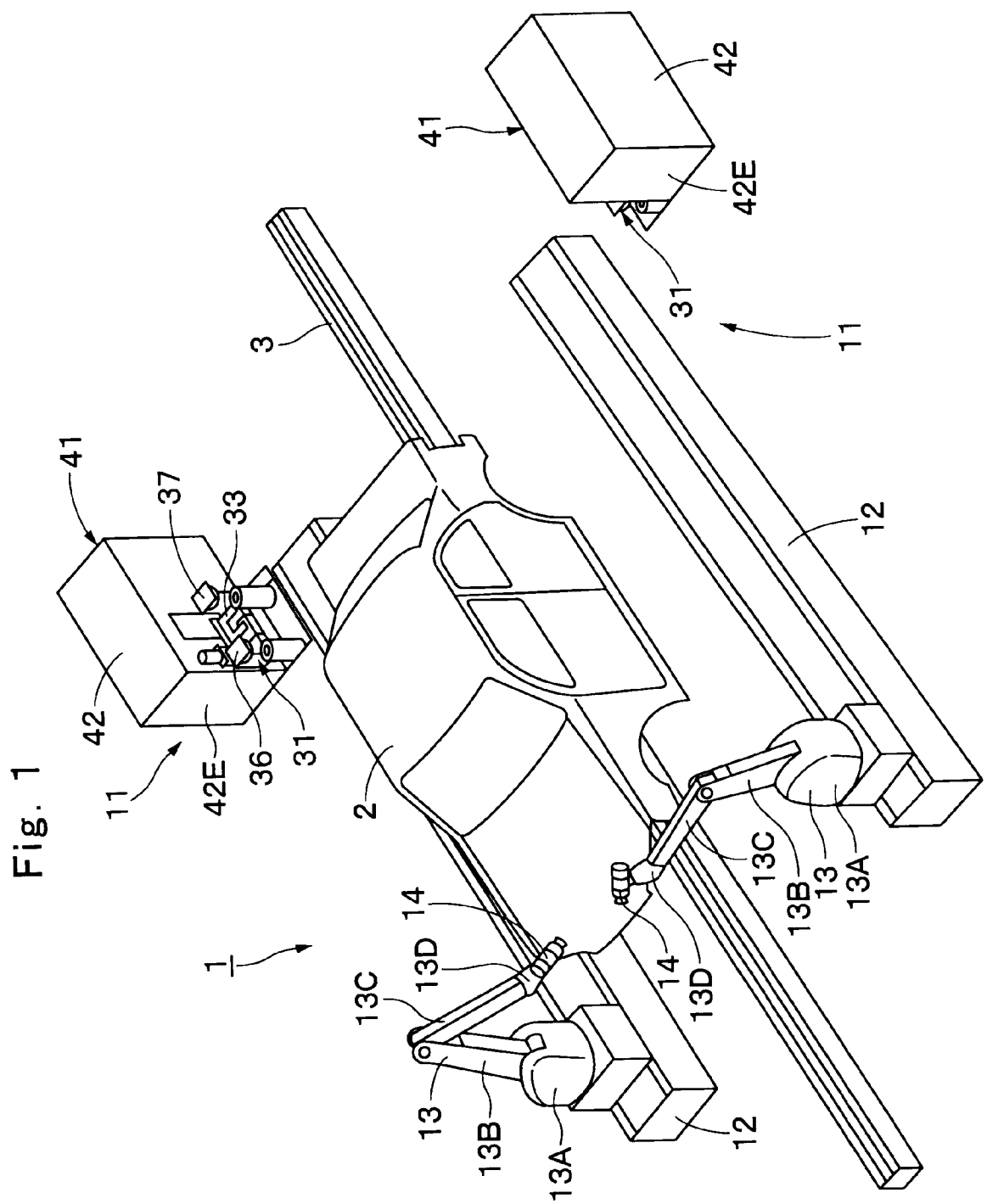
FIG. 1 is a perspective view of a vehicle body coating line incorporating a paint coating system embodying the present invention.
Figure 2:
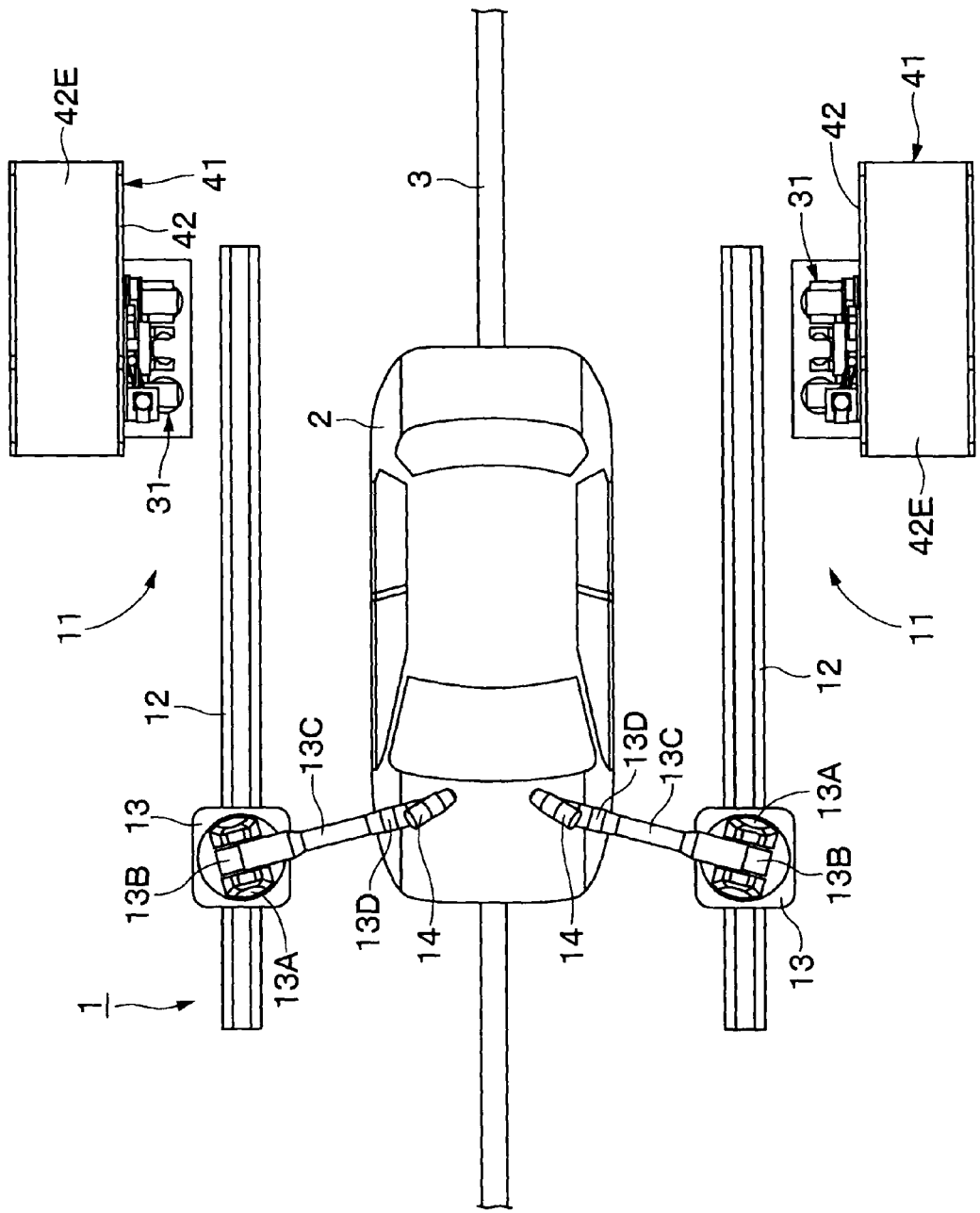
FIG. 2 is a plan view of the vehicle body coating line of FIG. 1.

In FIGS. 1 and 2, indicated at 1 is a coating line for coating a vehicle body 2. Moreover, at the half way of the conveyer 3, paint coating system 11, which will be described hereinafter, are located on the opposite side of the conveyer 3.

Indicated at 11 are paint coating systems which are located at the half way and cooperatively on the opposite sides of the conveyer 3. Each one of the paint coating systems 11 is largely constituted by a robot device 13, a coater unit 14, an atomizing head changing and washing device 31, and a cartridge changer 41, which will be described hereinafter.

Designated at 12 are tracking rails which are located in predetermined transversely spaced positions on the opposite side of the conveyer 3 in parallel relation with the latter. Each one of these tracking rails 12 constitutes a tracking mechanism to let each robot device 13, which will be described hereinafter, follow movements of a vehicle body 2 which is transferred by the conveyer 3.

Indicated at 13 are robot devices which are mounted on the tracking rails 12 for coating actions. The robot devices 13 are operative for painting the vehicle body 2 complying with the teaching instruction while letting coater units 14 provided on the distal ends of the robot device 13, which will be described hereinafter, follow the vehicle body 2.

Further, the robot device 13 are mounted on the tracking rails 12 and moved substantially in parallel relation with the conveyer 3, while each one of coater units 14 is put in coating actions along the vehicle body 2 to paint the latter from front to rear side. Moreover, the robot devices 13 are able to move a coater unit 14 as far as an atomizing head changing and washing device 31 to set the coater unit 14 in a predetermined changing position "O" for replacement.

Each robot device 13 which is mounted on the tracking rails 12 is provided with a multiarticular arm, and constructed of a carriage 13A which is movable in the transfer direction of the conveyer 3, a vertical arm 13B which is rotatably and swingably mounted on the carriage 13A, a horizontal arm 13C which is swingably connected to a fore distal end of the vertical arm 13B, and a wrist 13D which is rotatably and pivotally provided at a fore distal end of the horizontal arm 13C.

In this instance, when a common body 15 of a coater unit 14 is gripped by a common body gripper 33, which will be described hereinafter, a robot device 13 is controlled in a reduced power mode, lowering levels of driving forces (driving torques) which are generated in rotating motors, reciprocating actuators and the like (none of which is shown in the drawings) to put the arms 13B and 13C and the wrist 13D in predetermined actions. In the reduced power mode, the arms 13B and 13C as well as the wrist 13D and the like of the robot device 13 is freely movable state when an external force is applied. Thus, the common body 15 of the coater unit 14 becomes freely movable in any direction, permitting the common body gripper 33 move the coater unit 14 in an arbitrary direction to set the common body 15 accurately in a predetermined changing position "O".

Figure 3:
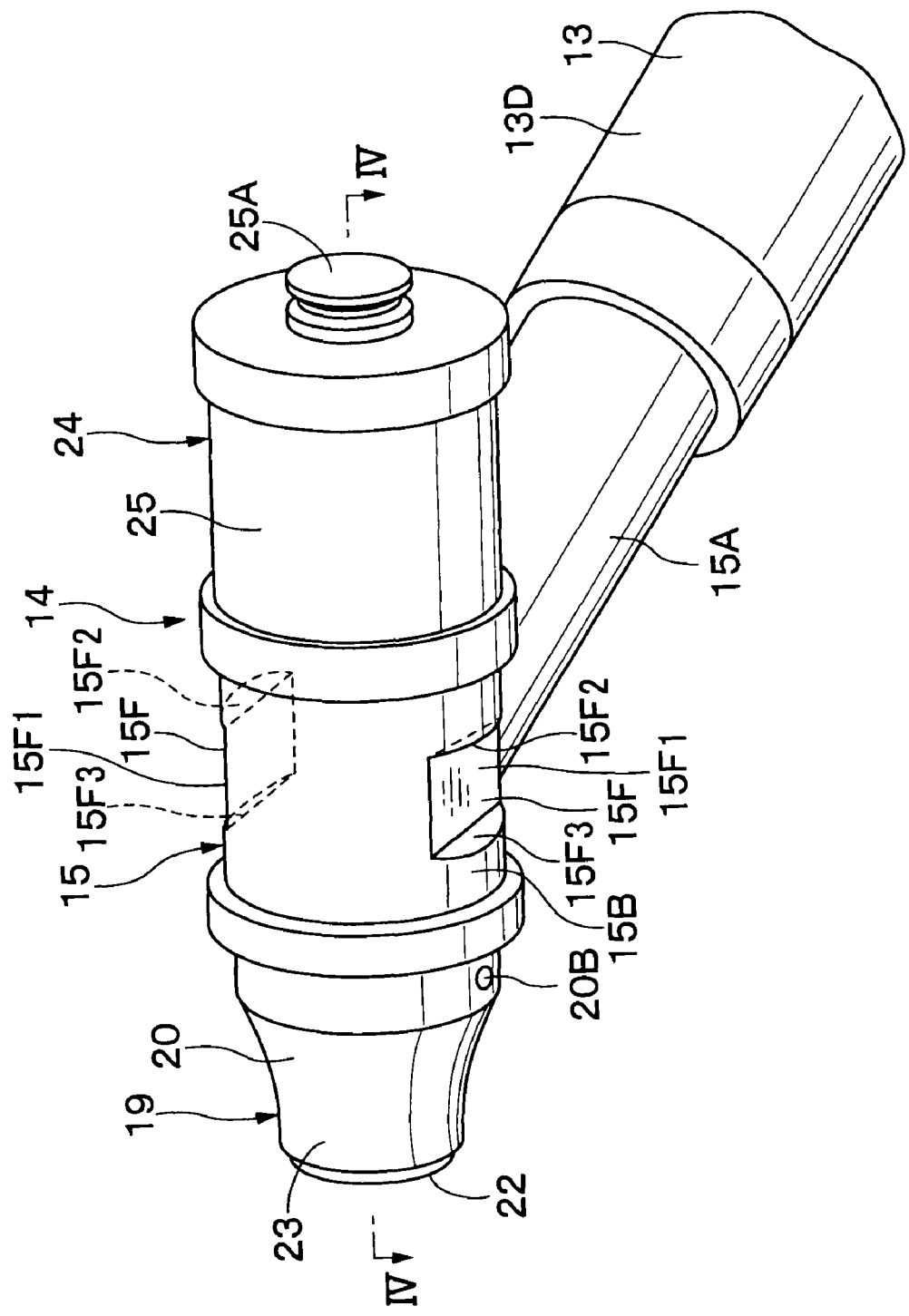
FIG. 3 is an enlarged perspective view of a coater unit which is mounted on a wrist of a robot device.

Indicated at 14 is a coater unit which is mounted on the wrist 13D at the fore distal end of the horizontal arm 13C which constructs the robot device 13. This coater unit 14 is operative for painting the vehicle body 2 and built as a rotary atomizing head type coating apparatus with a rotary atomizing head 22, which will be described hereinafter. As shown in FIG. 3, the coater unit 14 is largely constituted by a common body 15 and an atomizing head 19 and the like, which will be described hereinafter.

Figure 4:
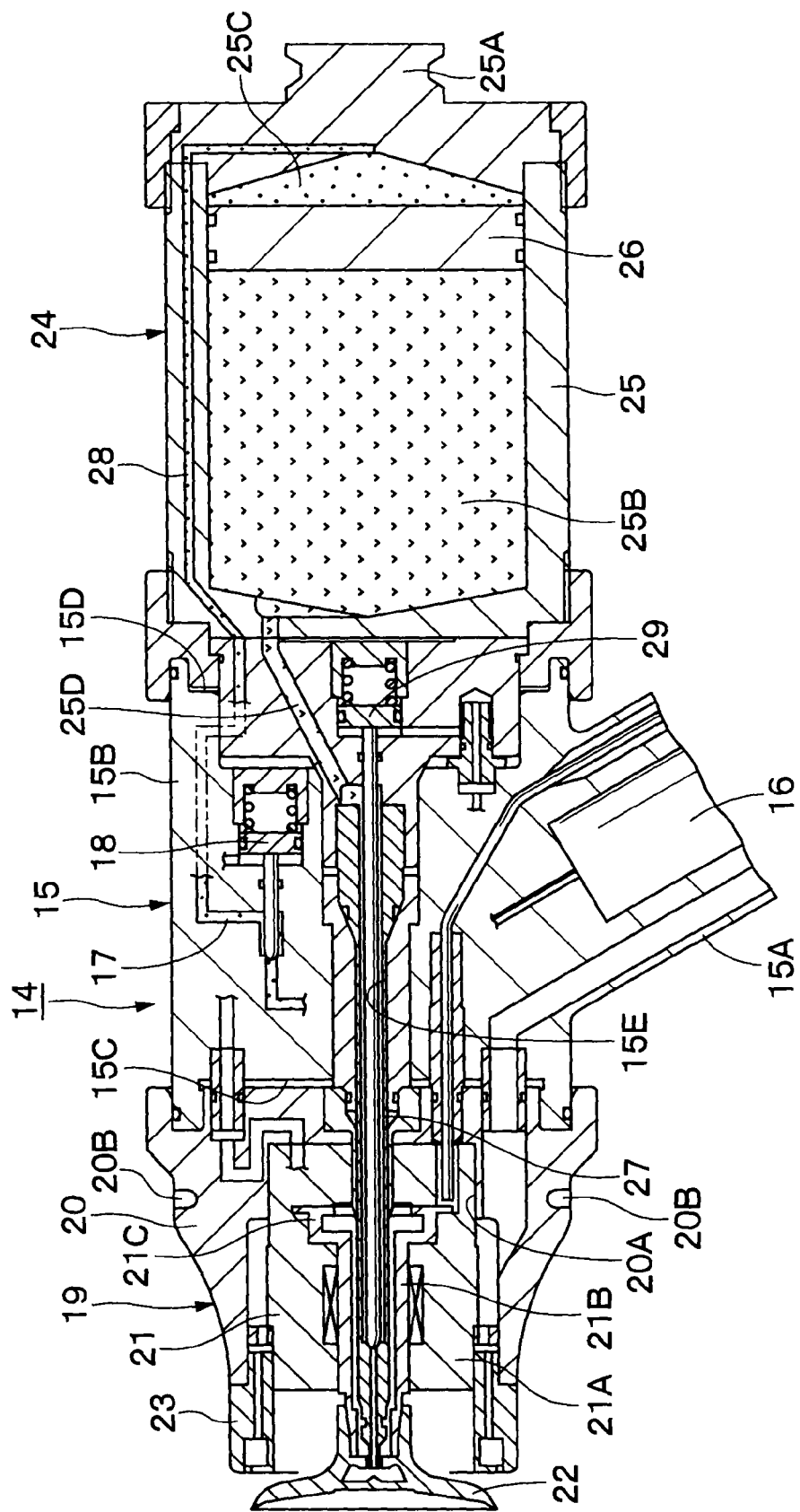
FIG. 4 is a longitudinal sectional view of the coater unit, taken from the direction of arrows IV-IV of FIG. 3.

Indicated at 15 is a common body which is fixedly mounted on the robot device 13, and on which a washed atomizing head 19 and a replenished paint cartridge 24 are to be mounted as replacements for a used atomizing head 19' and a used paint cartridge 24', respectively. As shown in FIGS. 3 and 4, the common body 15 is composed of a neck portion 15A which is attached to the wrist 13D at the fore distal end of the horizontal arm 13C and a cylindrical mount portion 15B which is integrally formed at the fore distal end of the neck portion 15A.

Figure 5:
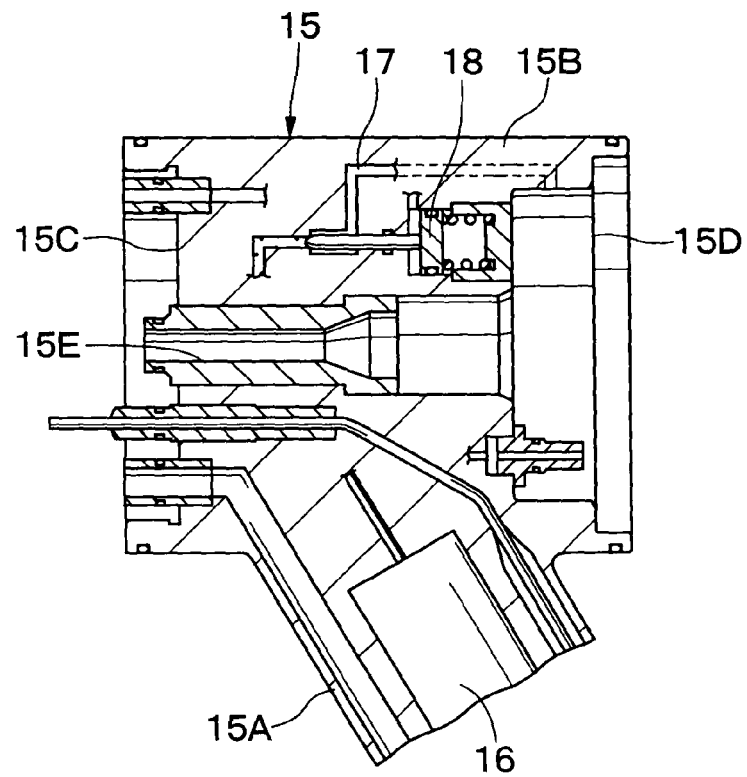
FIG. 5 is a longitudinal sectional view, showing a common body shown in FIG. 4.

Further, as shown in FIG. 5, provided on the front side of the mount portion 15B is an atomizing head coupler 15C to which an atomizing head 19 is replaceably connected as described hereinafter. On the other hand, provided on the rear side of the mount portion 15B is a cartridge holder socket 15D in which replaceably hold a paint cartridge 24. Further, a feed tube receptacle hole 15E is formed axially at the center of the mount portion 15B to receive a feed tube 27 of a paint cartridge 24 therein.

Figure 17:
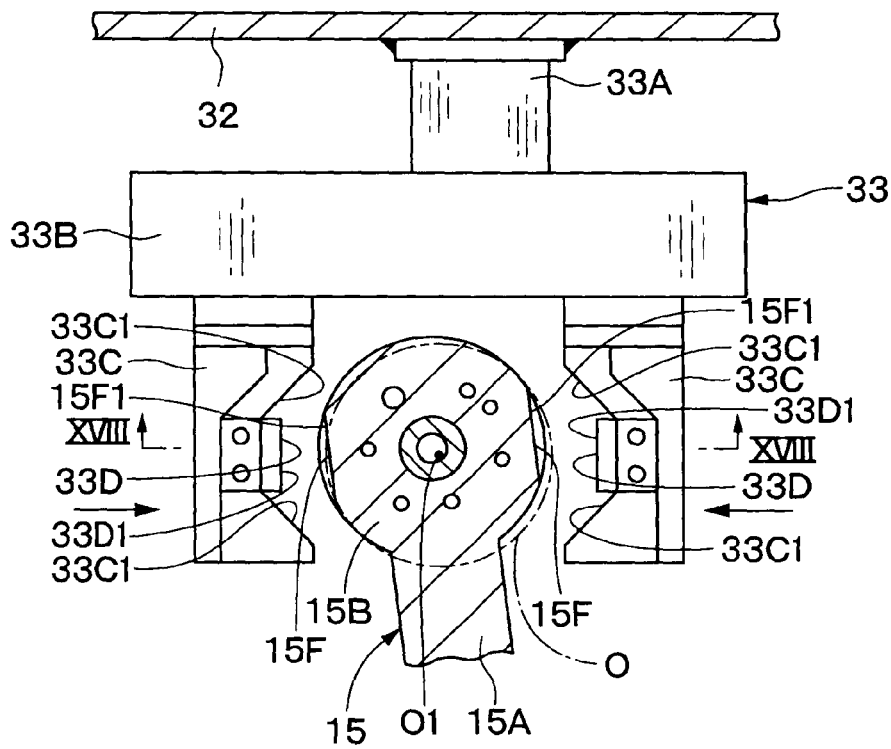
FIG. 17 is a schematic illustration explanatory of an operational action of positioning a common body of a coater unit between pawls of a common body gripper.
Figure 18:
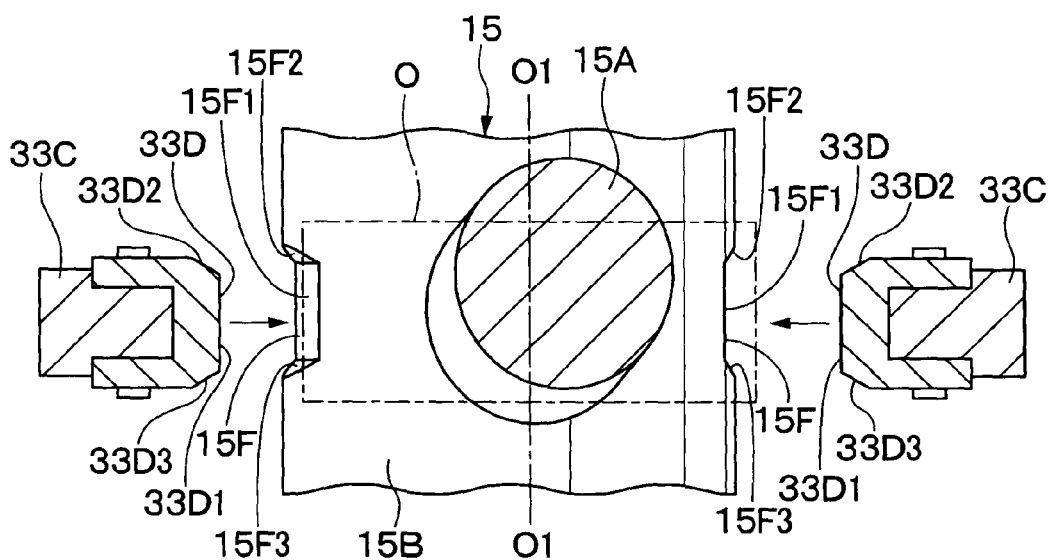
FIG. 18 is a schematic illustration explanatory in an enlarged view of an operational action of positioning the common body of the coater unit between pawls of the common body gripper, taken from the direction of arrows XVIII-XVIII of FIG. 17.

In this instance, as shown in FIGS. 3, 17 and 18 and the like, the mount portion 15B of the common body 15 is formed with a pair of grip surfaces 15F. These grip surfaces 15F serve as positioning portions for bringing the mount portion 15B to position in a rotational direction and also in a vertical direction at the time when the mount portion 15B is gripped on a common body gripper 33 which will be described hereinafter. More particularly, the grip surfaces 15F are in the form of indented surfaces which are formed in radially opposite positions on the circumference of the mount portion 15B. And, the grip surfaces 15F are defined by flat surfaces 15F1 which are parallel with each other in a radial direction, and one and the other inclined surfaces 15F2 and 15F3 rising from rear and front ends of the flat surfaces 15F1, respectively. In this instance, one and the other inclined surfaces 15F2 and 15F3 are inclined in axially forward and rearward directions of the mount portion 15B in a diverging fashion.

Figure 19:
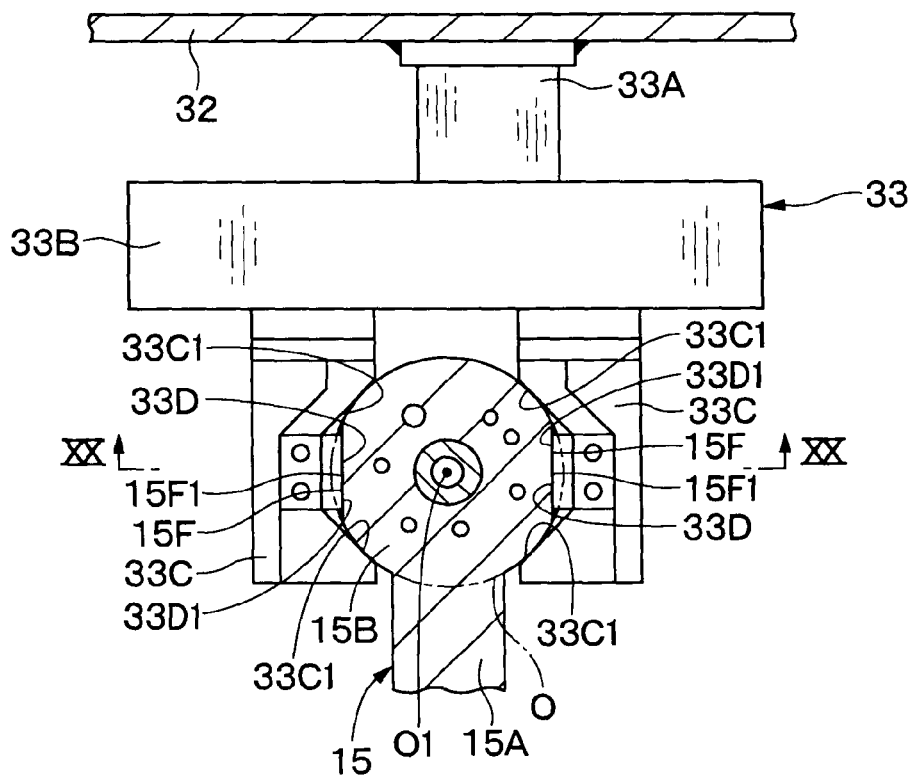
FIG. 19 is a schematic illustration explanatory of an operational action of gripping the common body of the coater unit by pawls of the common body gripper.
Figure 20:
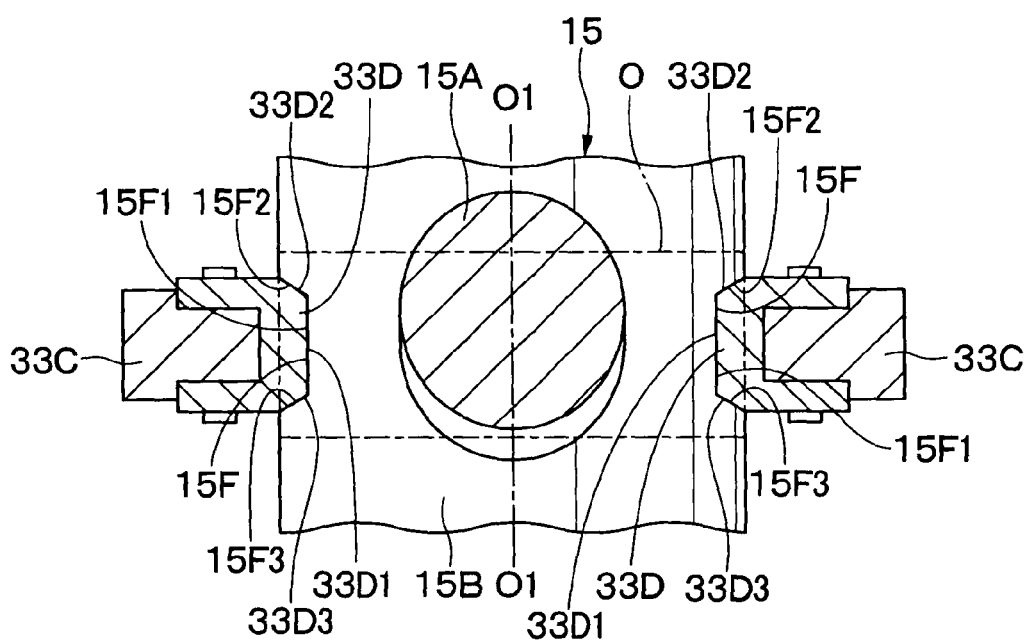
FIG. 20 is a schematic illustration explanatory in an enlarged view of an operational action of gripping the common body of the coater unit between pawls of the common body gripper, taken from the direction of arrows XX-XX of FIG. 19.

As shown in FIG. 19, each grip surfaces 15F is gripped by a radial positioners 33D of a common body gripper 33, which will be described hereinafter, with the flat surfaces 15F1 in abutting engagement with flat surfaces 33D1, to bring the common body 15 to position in the rotational direction relative to a vertical center axis O1-O1 of a changing position "O". Further, when the grip surfaces 15F are gripped in the radial positioner 33D of the common body gripper 33, one and the other inclined surfaces 15F2 and 15F3 are respectively abutted against inclined surfaces 33D2 and 33D3 on the part of the radial positioner 33D as shown in FIG. 20 to locate the common body 15 in position in the vertical direction.

Denoted at 16 is a high voltage generator which is provided on the neck portion 15A of the common body 15. For example, this high voltage generator 16 is constituted by a Cockcroft circuit, and adapted to apply a high voltage, e.g., a high voltage elevated to −60 to −120 kV, to a rotary atomizing head 22 through a rotational shaft 21B of an air motor 21, which will be described hereinafter.

Designated at 17 is an extruder liquid passage which is provided on the side of the common body 15 to circulate a liquid for extruding paint out of a paint cartridge 24 which is loaded on the common body side. Indicated at 18 is an extruder liquid valve which is provided in the course of the extruder liquid passage 17 in the common body 15. The supply of an extruder liquid to the paint cartridge 24 is controlled by opening and closing the extruder liquid passage 17 by this extruder liquid valve 18.

Figure 6:
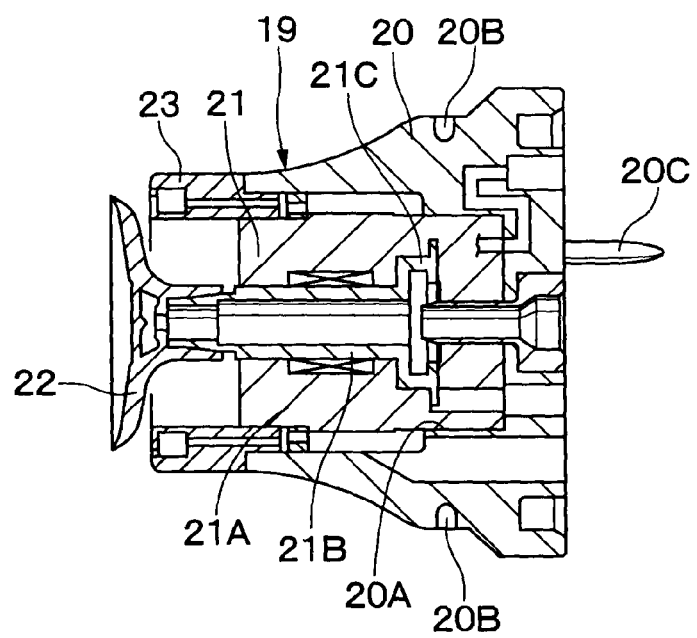
FIG. 6 is a longitudinal sectional view of an atomizing head shown in FIG. 4.

Indicated at 19 is an atomizing head which is removably connected to the atomizing head coupler 15C of the common body 15 (see FIG. 4). By this atomizing head 19, paint which is supplied from a paint cartridge 24, which will be described hereinafter, is sprayed toward the vehicle body 2. For example, two atomizing heads 19 are provided and interchangeably used properly. As shown in FIG. 6, each atomizing head 19 is constructed as a rotary atomizing head which is constituted by a body 20, an air motor 21, a rotary atomizing head 22 and a shaping air ring 23, which will be described hereinafter.

In this instance, in the description of operational actions which will be described hereinafter, a clean atomizing head from which paint has been washed off is referred to as "a washed atomizing head 19", and an atomizing head which is smudged with paint as a result of a coating operation is referred to as "a used atomizing head 19'".

Figure 21:
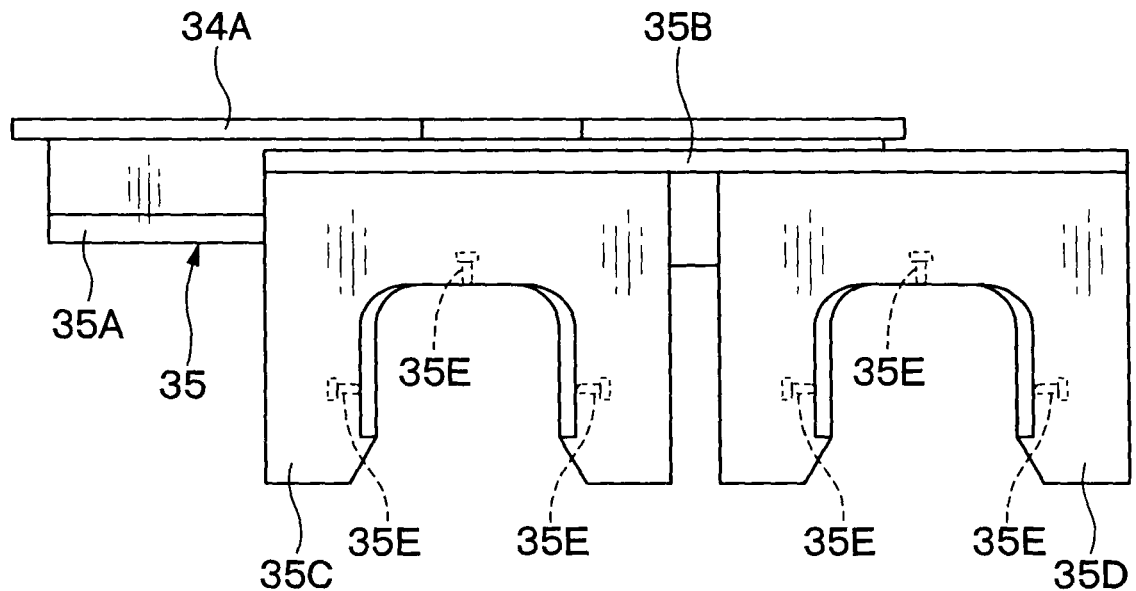
FIG. 21 is a plan view showing on an enlarged scale a gripping member of an atomizing head gripper.
Figure 22:
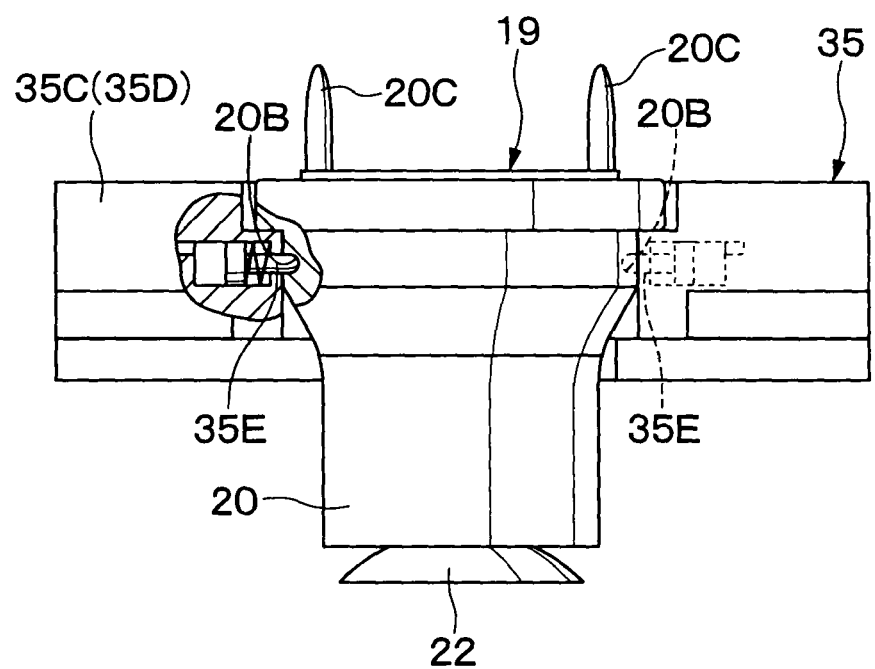
FIG. 22 is a partly cutaway enlarged front view of an atomizing head which is gripped by a gripping member of the atomizing head gripper.

Indicated at 20 is a body of the atomizing head 19, which forms an outer shell of the atomizing head 19. The body 20 is formed in a tapered cylindrical shape having a diameter which is gradually reduced in a forward direction. A motor receptacle cavity 20A is provided internally of the body 20. On the outer peripheral side of the body 20 is provided with, for example, three grip holes 20B (only two of which are shown in the drawings) to be engaged with protrusive prongs 35E which are provided on a gripping member 35C of an atomizing head gripper 35 as shown in FIGS. 21 and 22. Further, a positioning pin 20C is projected from the rear end of the body 20 to be engaged with a positioning hole (not shown) on the part of the common body 15 for setting position in the rotational direction.

Denoted at 21 is an air motor which is accommodated in the motor receptacle cavity 20A within the body 20. By an air turbine 21C of this air motor 21, a hollow rotational shaft 21B which is rotatably supported in a motor case 21A is driven to rotate at a high speed, for example, at a speed in the range of from 3000 r.p.m. to 150,000 r.p.m.

Indicated at 22 is a rotary atomizing head which is mounted on a fore end portion of the rotational shaft 21B of the air motor 21. This rotary atomizing head 22 is put in high speed rotation by the air motor 21, so that paint which is discharged from a feed tube 27 of a paint cartridge 24 is sprayed in the form of finely divided particles under the influence of centrifugal force.

Indicated at 23 is a shaping air ring which is provided at the fore end of the body 20, on the outer peripheral side of the rotary atomizing head 22. From this shaping air ring 23, shaping air is spurted forward to control a spray pattern of paint particles which are sprayed from the rotary atomizing head 22.

Figure 7:
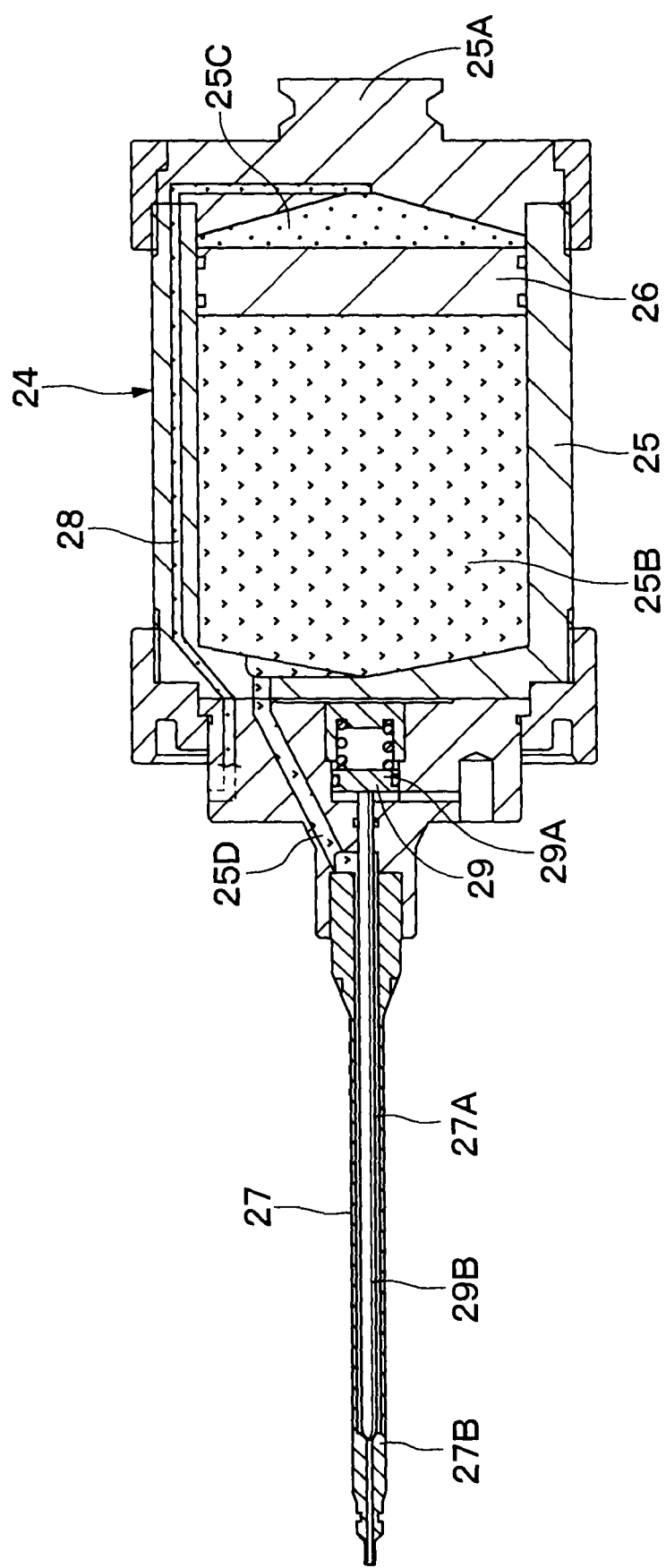
FIG. 7 is a longitudinal sectional view of a paint cartridge shown in FIG. 4.

Indicated at 24 is a paint cartridge which is detachably fitted in the cartridge holder socket 15D of the common body 15. A plural number of paint cartridges 24 of each different colors are mounted on a mount deck 42 of a cartridge changer 41 which will be described hereinafter. As shown in FIGS. 4 and 7, each paint cartridge 24 is largely constituted by a tank 25, a piston 26 and a feed tube 27.

In the description of operational actions which will be given hereinafter, a paint cartridge 24 which has been replenished with paint of a next color within the tank 25 is referred to as "a replenished paint cartridge 24", while an empty paint cartridge which has been consumed paint of a previous color within the tank 25 is referred to as "a used paint cartridge 24'".

Indicated at 25 is a tank of the paint cartridge 24, which is in the form of a tubular container closed at opposite axial ends. Further, projected on the rear side of the tank 25 is a grip portion 25A to be clasped by cartridge grippers 48B and 48C on a swing arm 48 which will be described hereinafter. A piston 26 is fitted in the tank 25 displaceably in the axial direction, defining a paint chamber 25B and an extruder liquid chamber 25C on the front and rear sides thereof. A paint passage 25D is provided in a front side portion of the tank 25, communicating a paint supply passage 27A of a feed tube 27 with the paint chamber 25B.

Denoted at 27 is a feed tube which is provided at the front end of the tank 25. At a base end, the feed tube 27 is securely fixed to a front portion of the tank 25. On the other hand, as shown in FIG. 4, in a fore end portion, the feed tube 27 is extended through the feed tube receptacle hole 15E of the common body 15 and opened toward the rotary atomizing head 22. Further, as shown in FIG. 7, a paint supply passage 27A is formed internally of the feed tube 27 in communication with the paint chamber 25B of the tank 25. Furthermore, the paint supply passage 27A is reduced stepwise in diameter in a fore end portion of the feed tube 27 to provide a valve seat 27B.

Indicated at 28 is an extruder liquid passage on the side of the paint cartridge, which is formed in the tank 25 in communication with the extruder liquid chamber 25C. As shown in FIG. 4, this extruder liquid passage 28 is communicated with the extruder liquid passage 17 on the side of the common body when the paint cartridge 24 is fittingly set in the cartridge holder socket 15D on the common body 15.

Designated at 29 is a paint valve which is provided in a front end portion of the tank 25 for the purpose of on-off control of paint supply to the atomizing head 19 from the feed tube 27. This paint valve 29 is constituted by an axially displaceable piston 29A, and a valve body 29B which is extended through the paint supply passage 27A of the feed tube 27 from the piston 29A and seated on and off the valve seat 27B at its fore end.

Now, with reference to FIGS. 2, 8 to 39, the description is directed to the construction of an atomizing head changing and washing device 31 which plays the roles of interchangeably mounting a couple of atomizing heads 19 and 19' on the common body 15 of the coater unit 14 located on the robot device 13 and washing a dismantled used atomizing head 19'.

Figure 11:
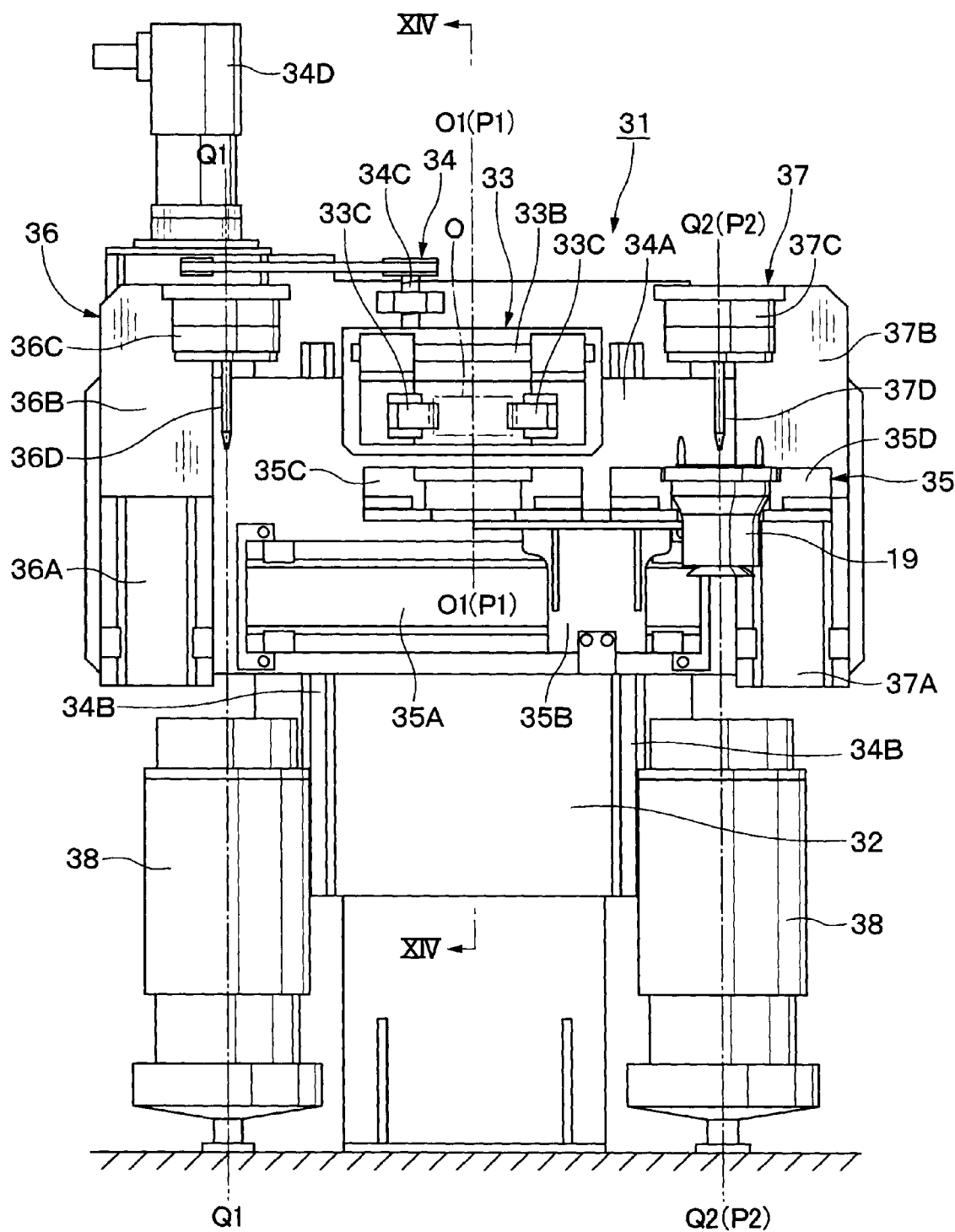
FIG. 11 is a front view showing on an enlarged scale the atomizing head changing and washing device of FIG. 8.
Figure 12:
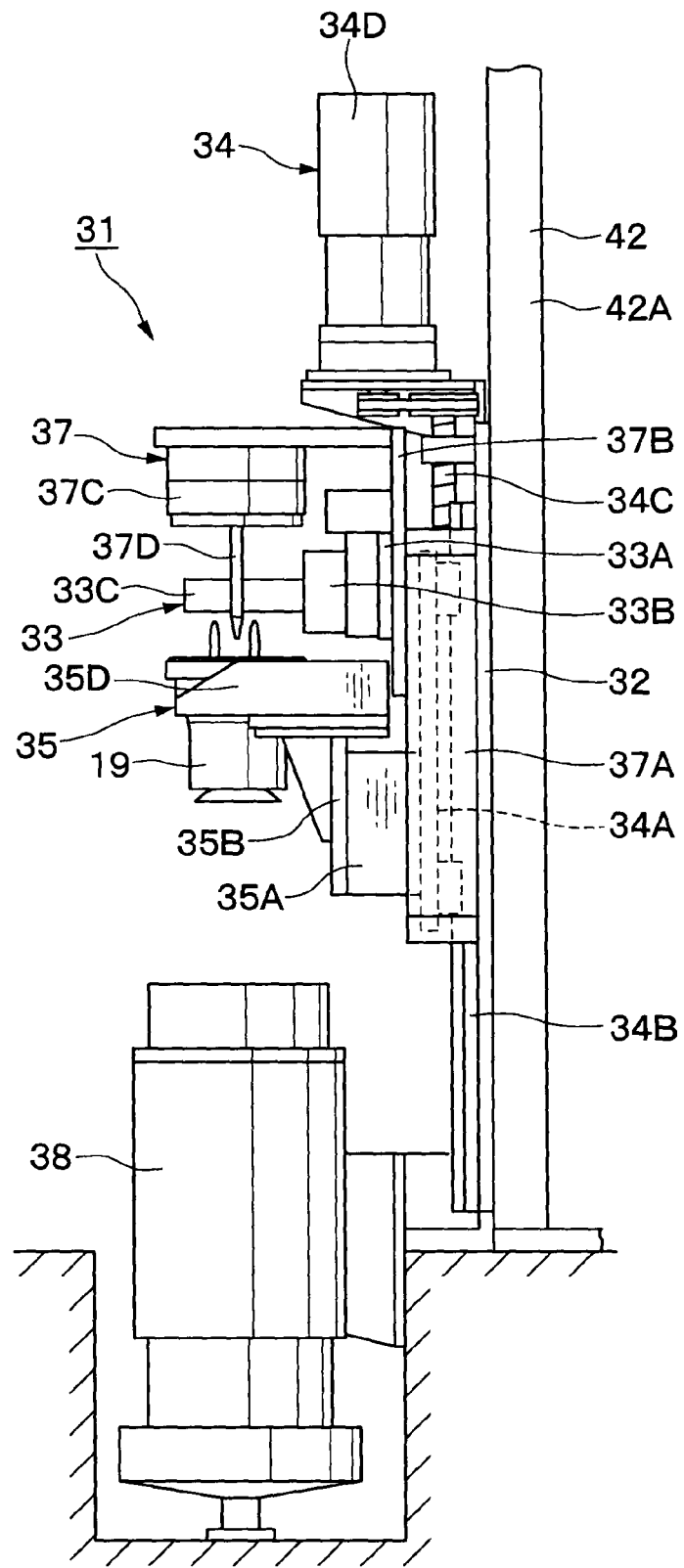
FIG. 12 is a right-hand side view of the atomizing head changing and washing device shown in FIG. 11.
Figure 13:
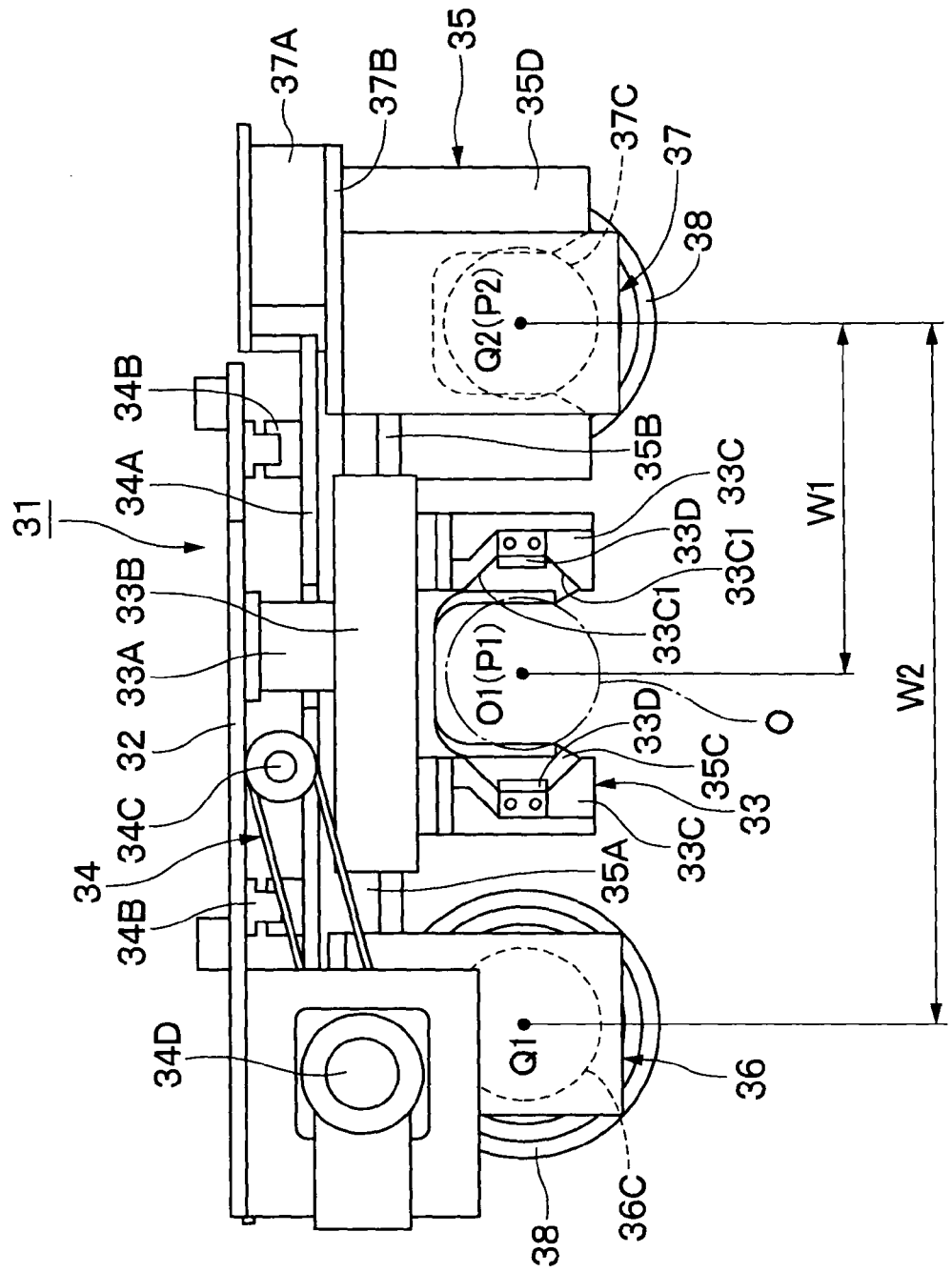
FIG. 13 is a plan view of the atomizing head changing and washing device shown in FIG. 11.

Namely, indicated at 31 is an atomizing head changing and washing device adopted in the present embodiment. As shown in FIG. 2, the atomizing head changing and washing device 31 is located within an operating range of the robot device 13 and in a position free of possibilities of interference with coating operations, for example, in a narrow space between the tracking rail 12 and a wall of a coating booth (not shown). By this atomizing head changing and washing device 31, a used atomizing head 19' on the common body 15 of the coater unit 14 is replaced with a washed atomizing head 19, and the dismantled used atomizing head 19' is washed clean. To serve for these purposes, as shown in FIGS. 11 to 13, the atomizing head changing and washing device 31 is constituted by a fixed plate 32, a common body gripper 33, an elevator 34, an atomizing head gripper 35, and washers 36 and 37 and the like, which will be described hereinafter.

Figure 8:
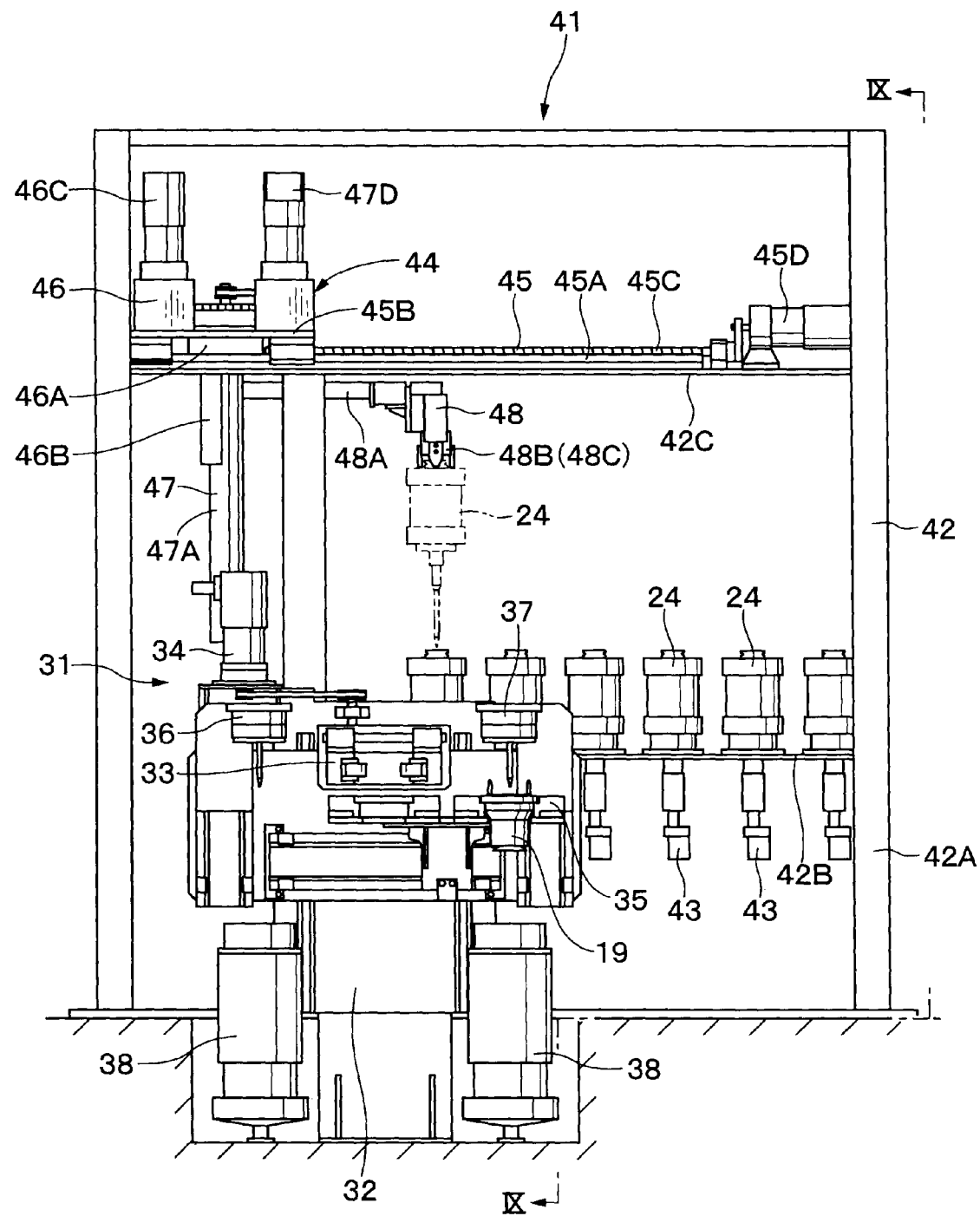
FIG. 8 is a front view of an atomizing head changing and washing device and a paint cartridge changer.
Figure 9:
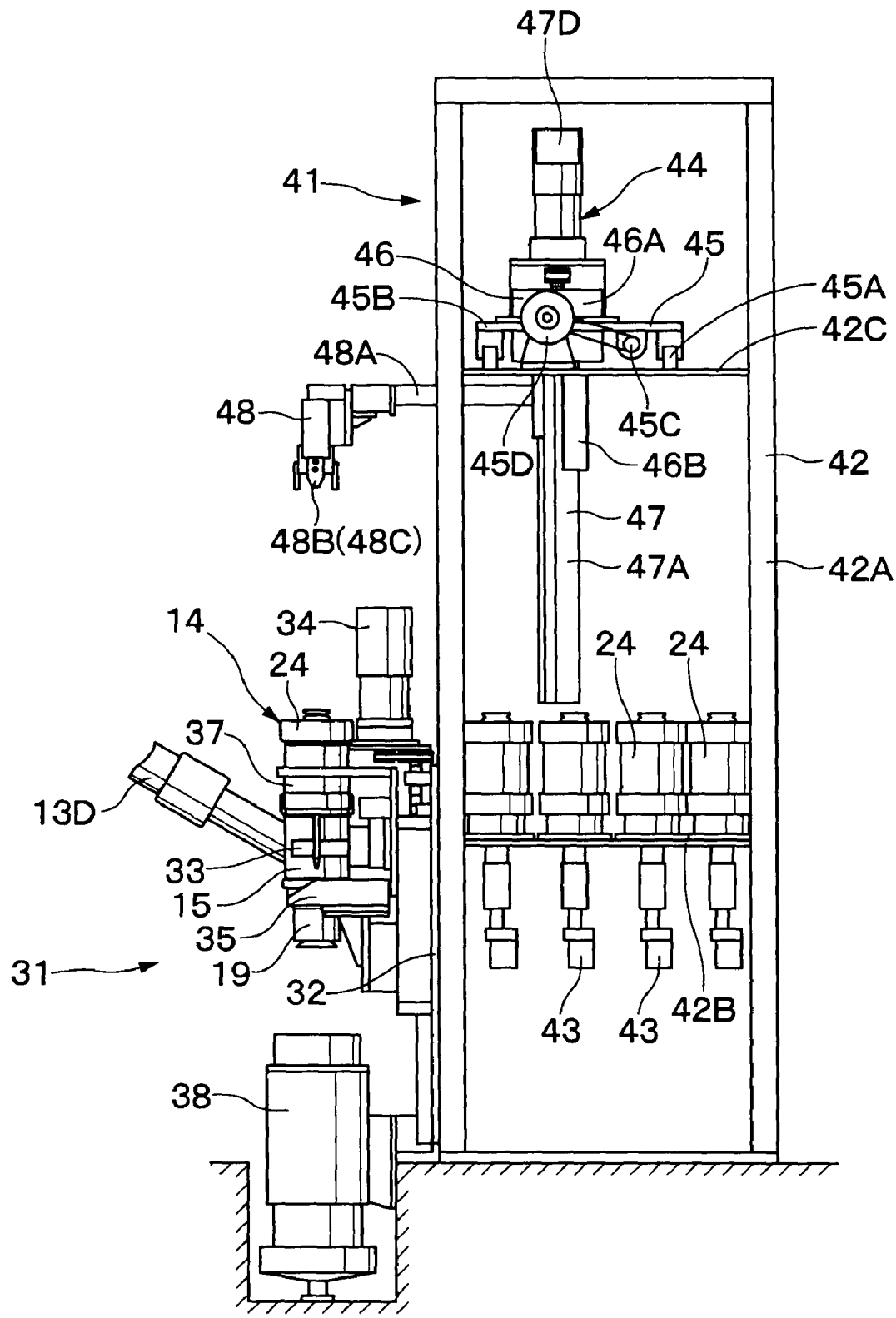
FIG. 9 is a right-hand side view of the atomizing head changing and washing device and the paint cartridge changer, taken from the direction of arrows IX-IX of FIG. 8.

Denoted at 32 is a fixed plate serving as a fixing member, which is a base of the atomizing head changing and washing device 31. This fixed plate 32 is in the form of a plate-like structure which is extended in a vertical direction. As shown in FIGS. 8 and 12, for example, the fixed plate 32 has its rear side securely fixed to the front side of a mount deck 42 of a cartridge changer 41, which will be described hereinafter, and has its lower side abutted on a floor surface and the like.

Figure 14:
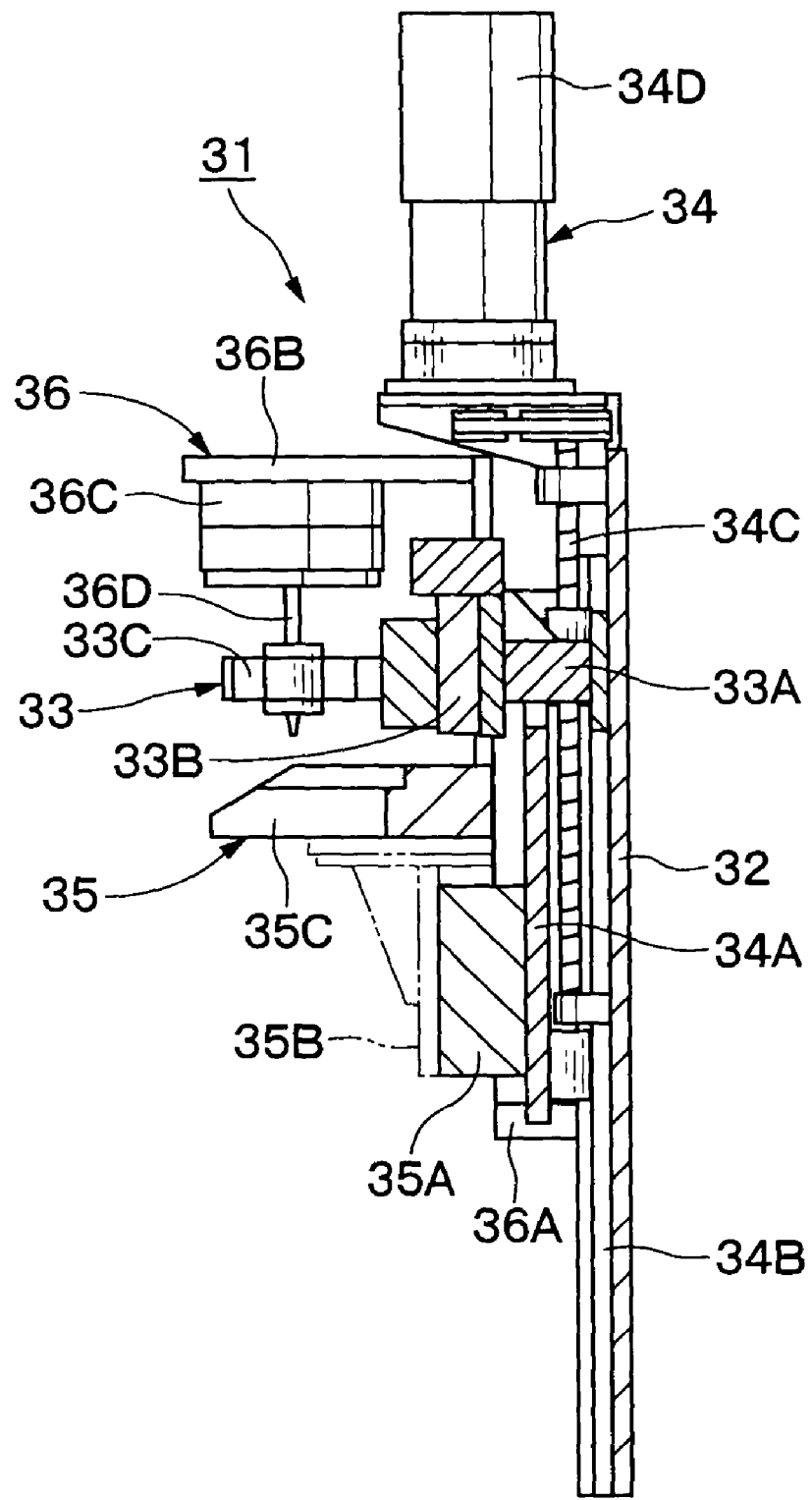
FIG. 14 is a sectional view of the atomizing head changing and washing device, taken from the direction of arrows XIV-XIV of FIG. 11.
Figure 15:
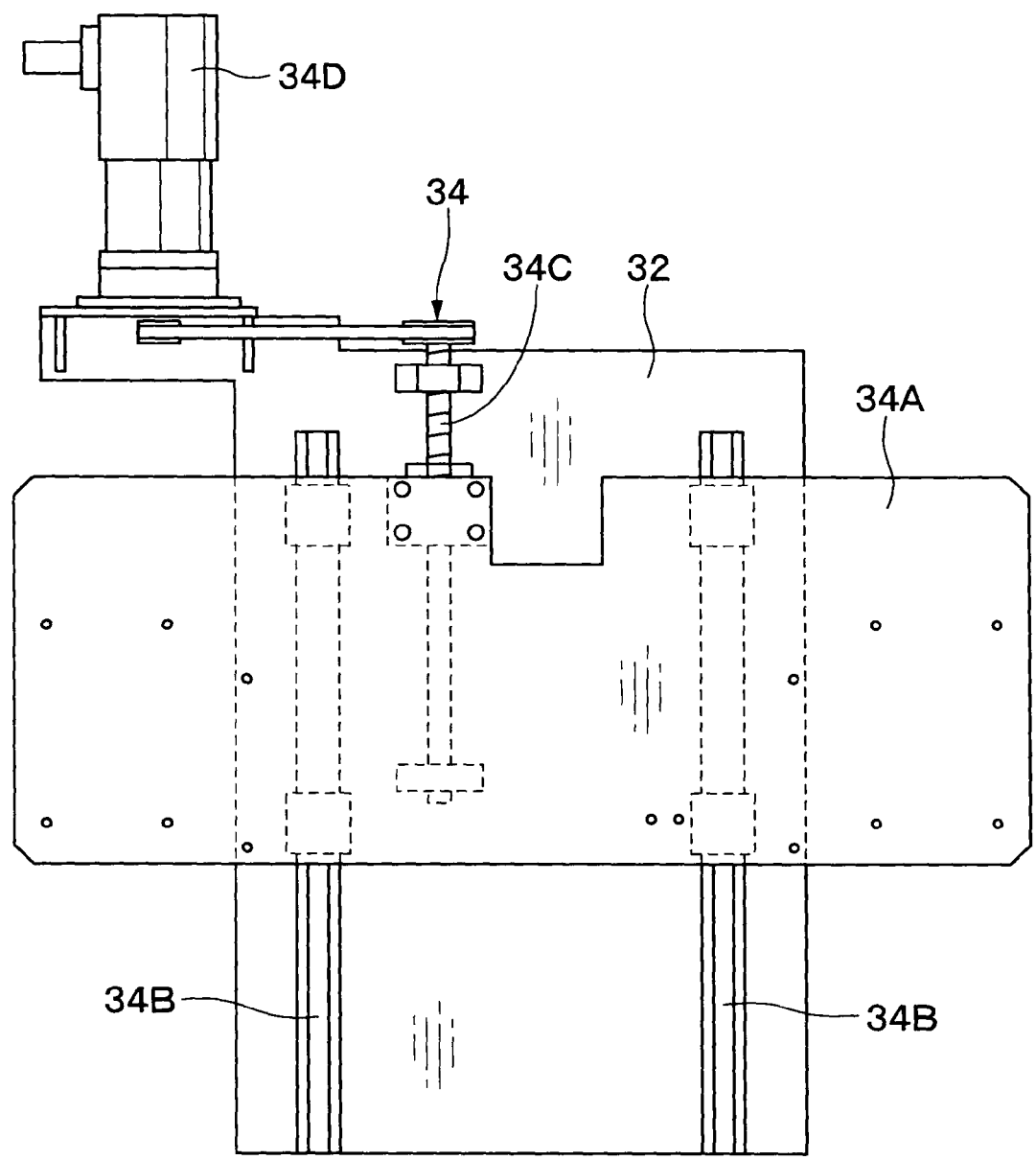
FIG. 15 is a front view of a fixed plate and an elevator.
Figure 16:
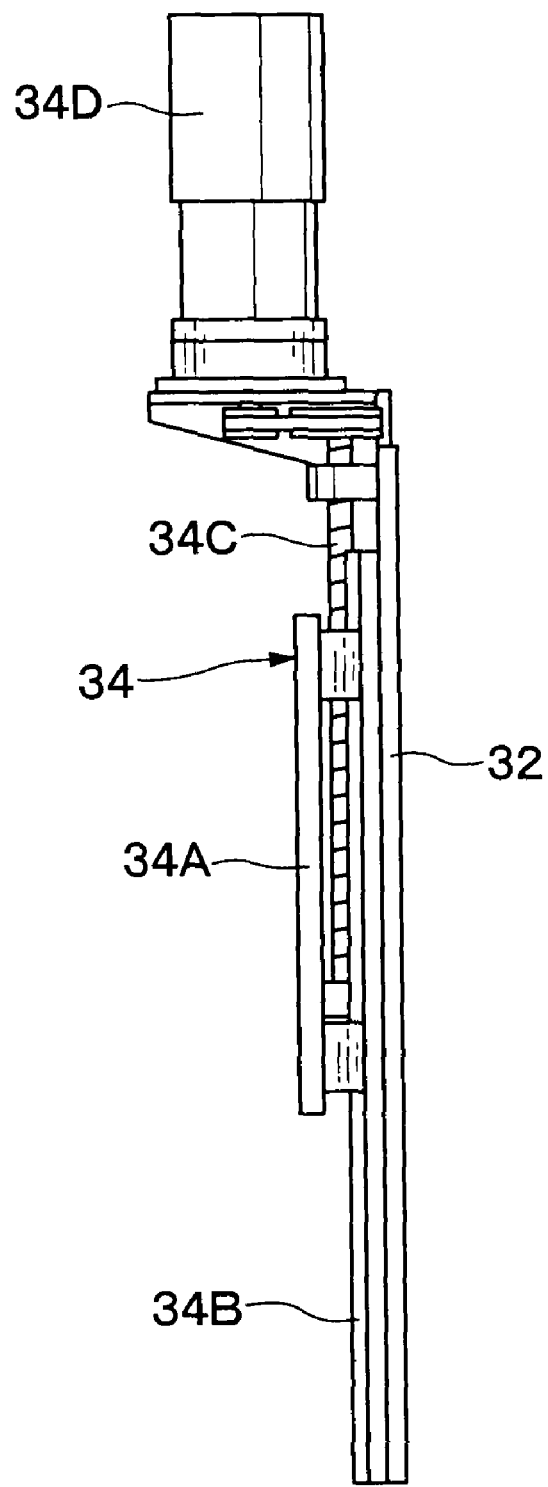
FIG. 16 is a right-hand side view of the fixed plate and elevator shown in FIG. 15.

Indicated at 33 is a common body gripper which is fixedly mounted in a position where it can grip the common body 15 of the coater unit 14 on the robot device 13, that is, in an upper portion of the fixed plate 32 as shown in FIG. 14 and the like. By this common body gripper 33, the common body 15 is fixedly positioned in the changing position "O" of the atomizing head changing and washing device 31 at the time of replacing the atomizing head 19 and paint cartridge 24 on the common body 15 of the coater unit 14.

In this instance, as shown in chained line in FIGS. 11, 13, 17 and 18, the changing position "O" of the atomizing head changing and washing device 31 means a position at which the grip surfaces 15F of the common body 15 are fixedly gripped by radial positioners 33D of the respective gripping pawls 33C of a common body gripper 33, which will be described hereinafter. Since the common body gripper 33 is fixedly mounted on the fixed plate 32, the changing position "O" can be determined as an immovable specific position (a specific space) which is surrounded by a pair of gripping pawls 33C. Therefore, when gripped by the common body gripper 33, the common body 15 is fixedly retained in a specific position on a vertical center line O1-O1 passing through the center of the changing position "O".

As shown in FIG. 13, the common body gripper 33 is largely constituted by a mount frame 33A which is mounted on and forwardly projected from an upper portion of the fixed plate 32, an actuator 33B which is transversely attached to a fore distal end of the mount frame 33A, a pair of gripping pawls 33C which are mounted in transversely confronting positions on the actuator 33B for movement toward and away from each other, and radial positioners 33D which are attached in confronting positions on the gripping pawls 33C. In this instance, the actuator 33B, for example, provides drive members which are moved toward and away from each other by an air cylinder or a motor (none of which are shown in the drawings) or the like and the gripping pawls 33C are attached to drive members to put the gripping pawls 33C in gripping and releasing motions.

Further, as shown in FIGS. 19 and 20, after transfer to the changing position "O" of the atomizing head changing and washing device 31 by the robot device 13, the mount portion 15B of the common body 15 of the coater unit 14 is fixedly gripped between the gripping pawls 33C. Each one of the gripping pawls 33C is provided with inclined surfaces 33C1 in base and fore end portions in parallel relation with the vertical center line O1-O1 passing through the changing position "O". Under guidance of these inclined surfaces 33C1, the mount portion 15B of the common body 15 is brought into alignment with the changing position "O" of the atomizing head changing and washing device 31 when gripped by the gripping pawls 33C.

The radial positioners 33D are each provided with flat surfaces 33D1 which are disposed parallel with the center line O1-O1 and faced toward each other across the center line O1-O1, and one and the other inclined surfaces 33D2 and 33D3 which are provided at the opposite ends of each one of the flat surfaces 33D1. In this instance, one inclined surface 33D2 is inclined substantially at the same angle as one inclined surface 15F2 of the grip surface 15F on the common body 15, while the other inclined surface 33D3 is inclined substantially at the same angle as the other inclined surface 15F3 of the grip surface 15F.

Thus, as the mount portion 15B of the common body 15 is gripped between the pawls 33C, the radial positioners 33D are abutted against the grip surfaces 15F on the mount portion 15B, and as a result the common body 15 is automatically set in the changing position "O". Namely, as shown in FIG. 19, the flat surfaces 33D1 of the radial positioners 33D are brought into abutting engagement with the flat surfaces 15F1 of the grip surfaces 15F provided on the common body 15 thereby bringing the common body 15 automatically into position in the rotational direction. In addition, as shown in FIG. 20, by abutting engagement of the inclined surfaces 33D2 and 33D3 with the inclined surfaces 15F2 and 15F3 of the grip surfaces 15F, the common body 15 is at the same time automatically set in position in a vertical direction.

Figure 40:
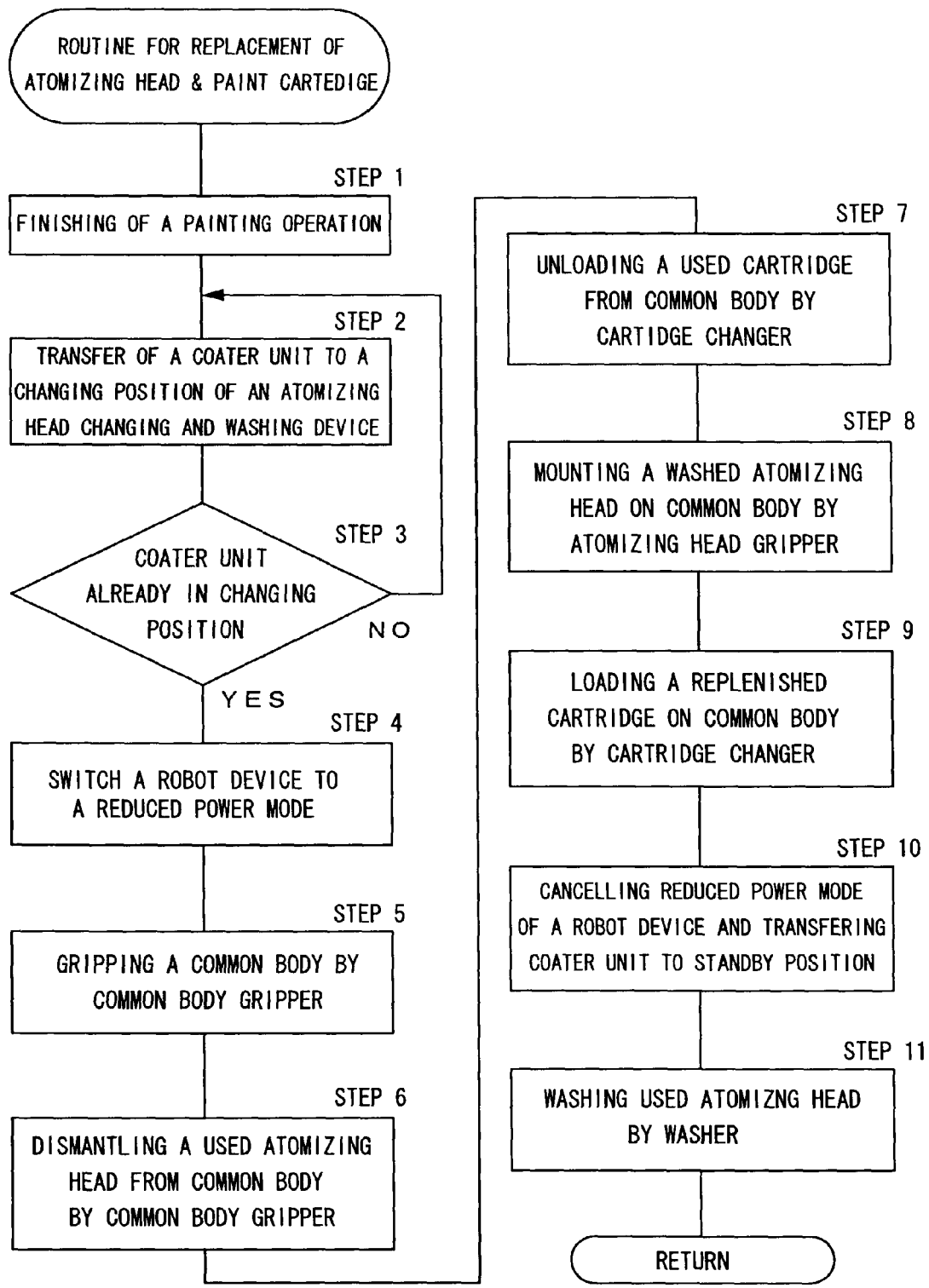
FIG. 40 is a flow chart showing operational steps for replacement of an atomizing head and a paint cartridge.

In this instance, at the time of gripping the mount portion 15B of the common body 15 by the respective gripping pawls 33C and radial positioners 33D of the common body gripper 33, a control mode is switched to a reduced power mode, as shown by Step 4 in the flow chart of FIG. 40. Namely, the robot device 13 is switched to a reduced power mode, lowering the level of a driving force, such as rotational torque which is applied to the arms 13B and 13C and the wrist 13D of the robot device 13 from a rotational motor or a reciprocating actuator (none of which is shown in the drawings), permitting to move the arms 13B and 13C and the wrist 13D freely by an external force. As a result, the common body 15 of the coater unit 14 is put, so to say, in a free state and can be turned to an arbitrary direction by application of an external force.

Therefore, by gripping the mount portion 15B of the common body 15 which was delivered by the robot device 13 by each gripping pawls 33C, the common body gripper 33 which is mounted on the fixed plate 32 can easily correct a positional deviation against the robot device 13 by each inclined surface 33C1 and set the position of the mount portion 15B of the common body 15 to the changing position "O" of the atomizing head changing and washing device 31.

Besides, even if the common body 15 is located in a deviated position in a rotational direction as shown in FIG. 17, such a positional deviation in a rotational direction of the common body 15 can be corrected by the common body gripper 33 as shown in FIG. 19 by abutting engagement of the flat surfaces 33D1 of the radial positioners 33D of the common body gripper 33 with the flat surfaces 15F1 in the grip surfaces 15F on the mount portion 15B.

Further, when the grip surfaces 15F of the common body 15 are gripped between the radial positioners 33D, the inclined surfaces 33D2 and 33D3 of the radial positioners 33D are brought into abutting engagement with the inclined surfaces 15F2 and 15F3 on the part of the grip surfaces 15F. As a consequence, even if the common body 15 is in a vertically deviated position as shown in FIG. 18, such a vertical positional deviation of the common body 15 can be corrected by the common body gripper 33 as shown in FIG. 20.

Thus, by the common body gripper 33, the coater unit 14 can be automatically set in the proper changing position "O" of the atomizing head changing and washing device 31 in a correctly oriented state, permitting to mount and dismantle the atomizing head 19 and paint cartridge 24 against the common body 15 free of interferences which would result in exertion of unduly large loads.

Indicated at 34 is an elevator which is provided on the front side of the fixed plate 32 to move up and down an atomizing head gripper 35 as well as washers 36 and 37, which will be described hereinafter. Further, as shown in FIGS. 11 to 16, the elevator 34 is largely constituted by a mount plate 34A which is disposed face to face with the fixed plate 32, a guide rail 34B which is located between the mount plate 34A and the fixed plate 32 to guide upward and downward movements of the mount plate 34A, a feed screw 34C for moving the mount plate 34A up and down, and a motor 34D which is mounted above the fixed plate 32 to drive the feed screw 34C.

As the feed screw 34C is rotationally driven by the motor 34D of the elevator 34, the atomizing head gripper 35, and washers 36 and 37 are moved up and down along with the mount plate 34A to and from three vertically shifted positions (i.e., position A, position B and position C) which will be described hereinafter.

Indicated at 35 is an atomizing head gripper which is mounted on the mount plate 34A of the elevator 34. This atomizing head gripper 35 is largely constituted by a cylinder 35A which is mounted transversely on a lower portion of the mount plate 34A, a movable plate 35B of substantially T-shape which is attached to the cylinder 35A for movements in rightward and leftward directions, a U-shaped gripping member 35C which is projected forward from a left side of the movable plate 35B, and other U-shaped gripping member 35D which is projected forward from right side of the movable plate 35B. In this instance, the cylinder 35A, for example, employs a rodless cylinder type actuator operated by pneumatic pressure or magnetic force.

As shown in FIG. 21, each one of the left and right gripping members 35C and 35D is provided with protrusive prongs 35E in three positions, i.e., in right, left and inner side positions. As shown in FIG. 22, as soon as an atomizing head 19 is located in the gripping member 35C or 35D, each protrusive prong 35E is driven to protrude toward the atomizing head 19 by supply of driving air. At this time, the respective protrusive prongs 35E are urged to fit in grip holes 20B which are formed on the body 20 of the atomizing head 19 and to fix the atomizing head 19 in place.

Further, as shown in FIG. 13, the atomizing head gripper 35 is so arranged that a center line P1-P1 of the gripping member 35C on the left side is at a distance W1 from a center line P2-P2 of the gripping member 35D on the right side. This interval W1 between the paired gripping members 35C and 35D is ½ of an interval W2 between washers 36 and 37 which will be described hereinafter (W1=W2/2).

Figure 30:
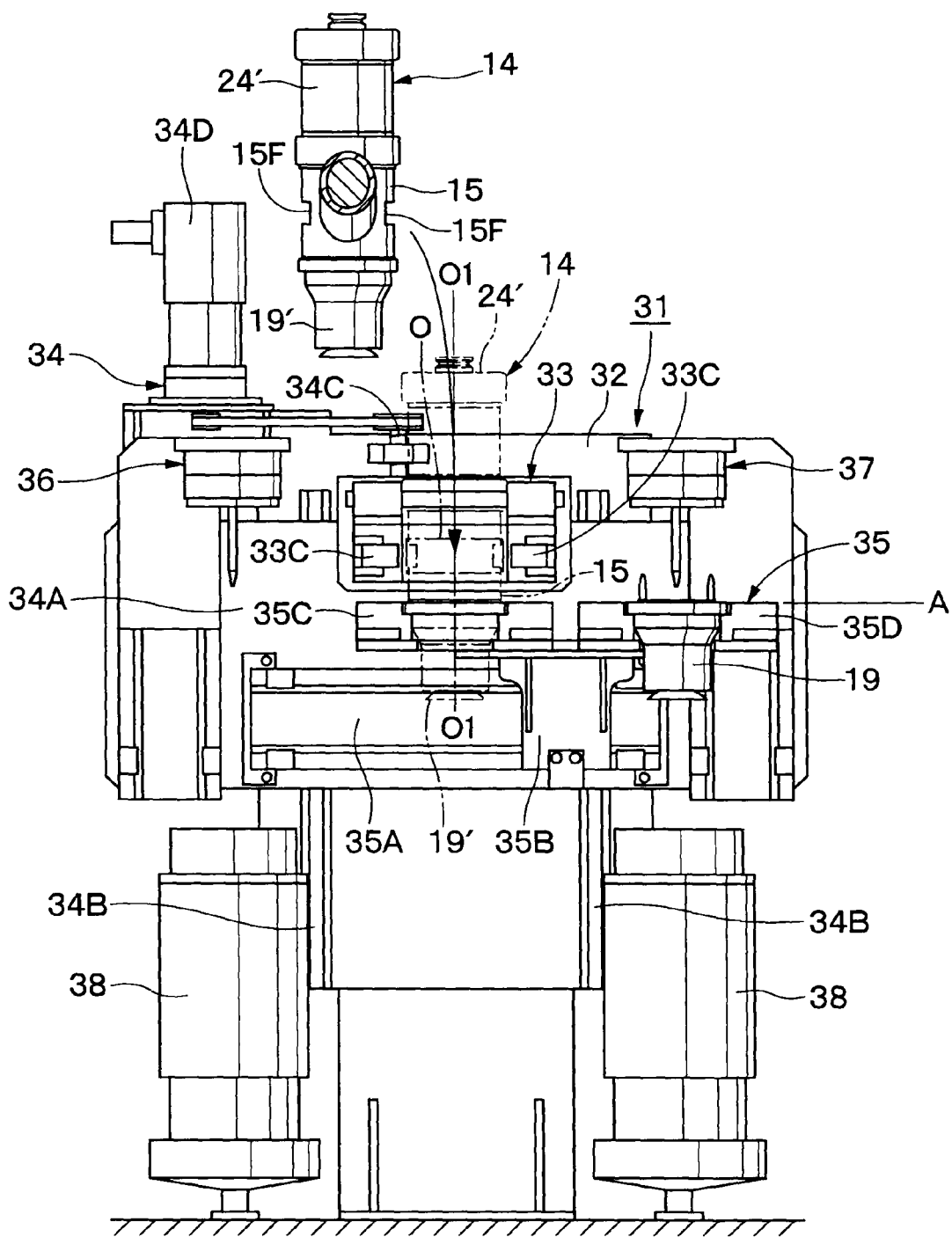
FIG. 30 is a schematic illustration explanatory of an operational action of transferring a coater unit to a common body gripper.
Figure 31:
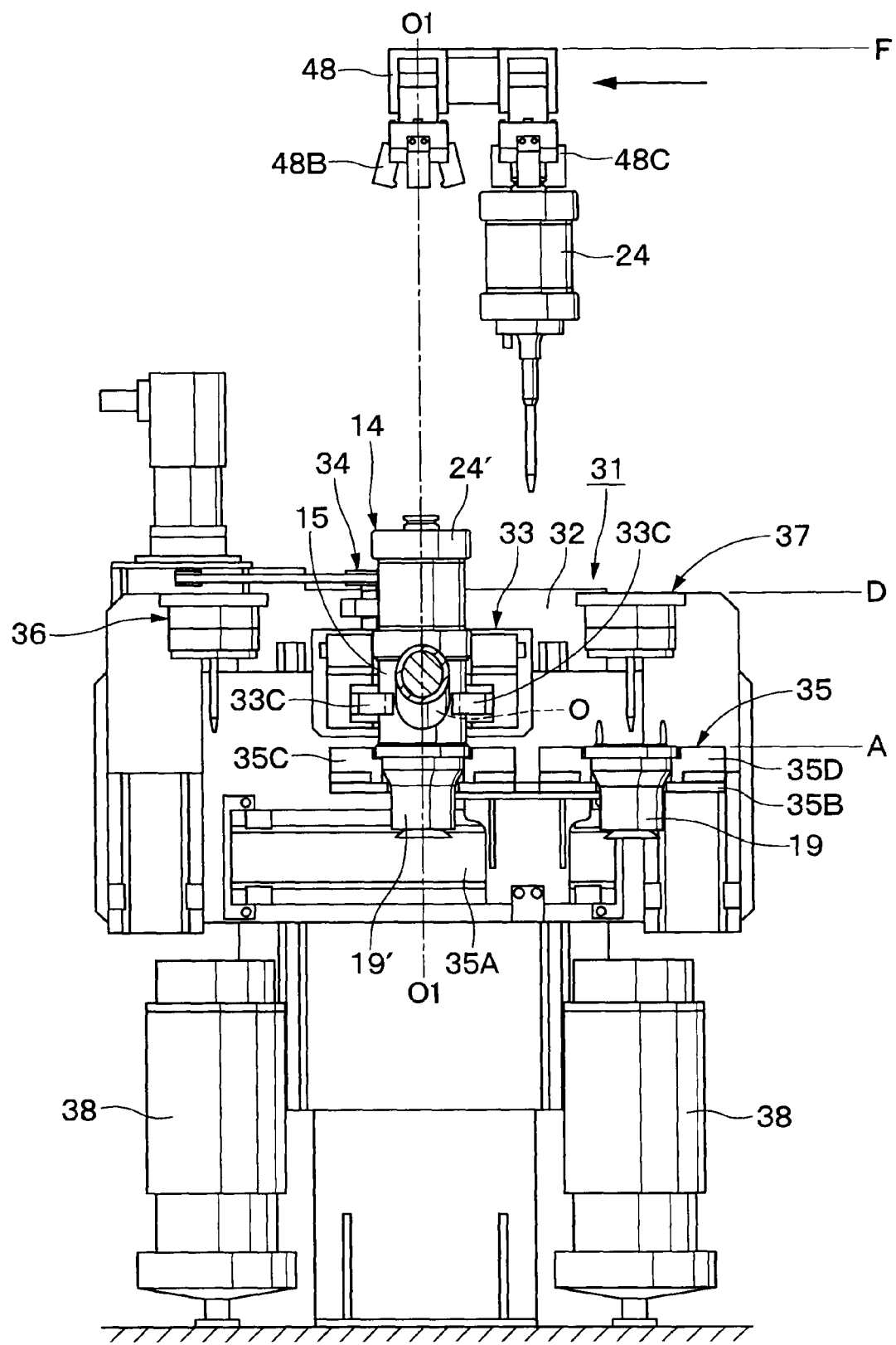
FIG. 31 is a schematic illustration explanatory of an operational action of transferring a replenished paint cartridge toward the atomizing head changing and washing device.

As shown in FIG. 30, when the common body 15 of the coater unit 14 is gripped by the common body gripper 33, the atomizing head gripper 35 is located in the uppermost position A by the elevator 34. In this position A, as shown in FIG. 31, the atomizing head gripper 35 can grip a used atomizing head 19' by the gripper member 35C (35D) simultaneously with the common body 15 gripping operation by the common body gripper 33.

Figure 32:
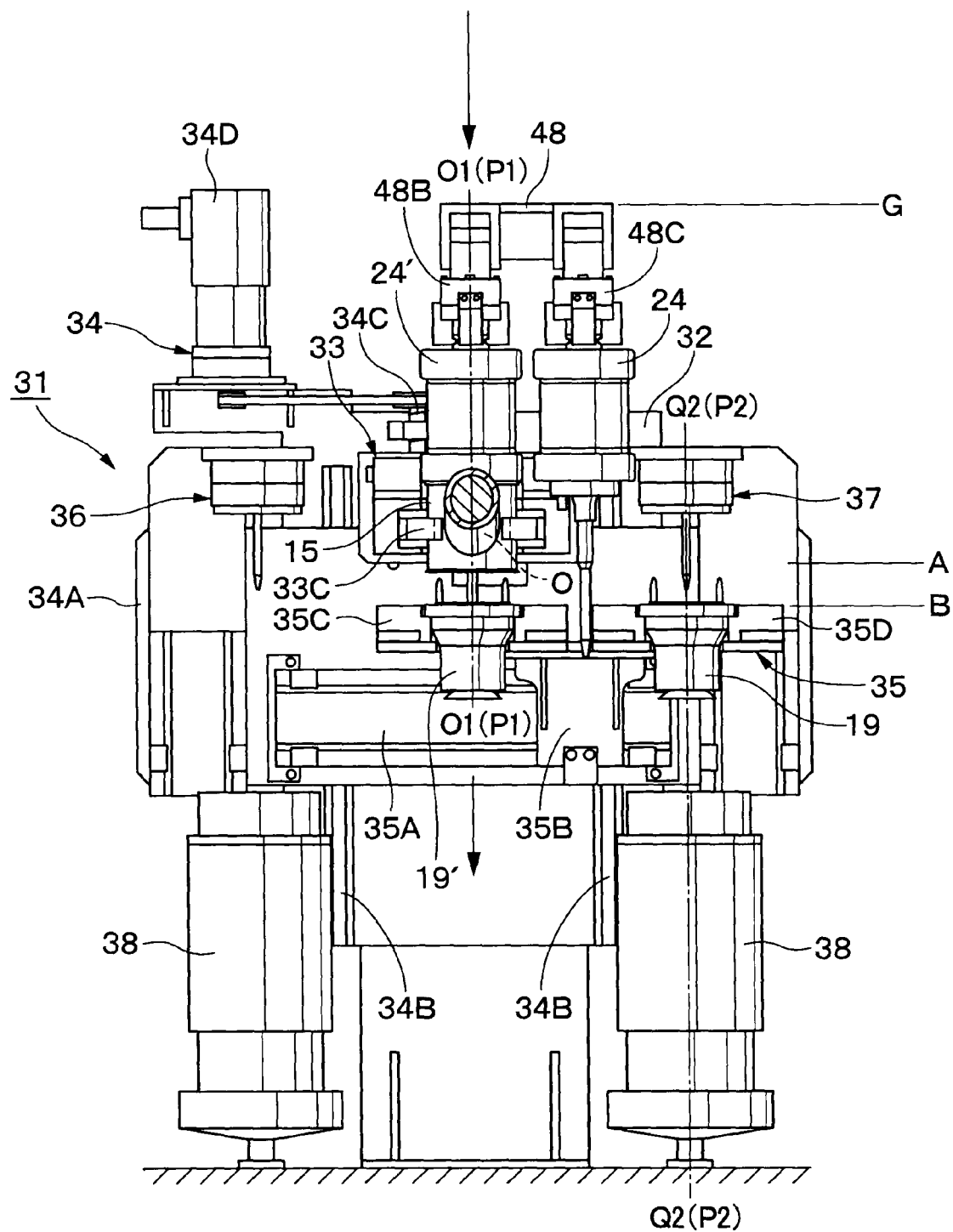
FIG. 32 is a schematic illustration explanatory of operational actions of detaching a used atomizing head from a common body, and holding a used paint cartridge in a gripped state.
Figure 33:
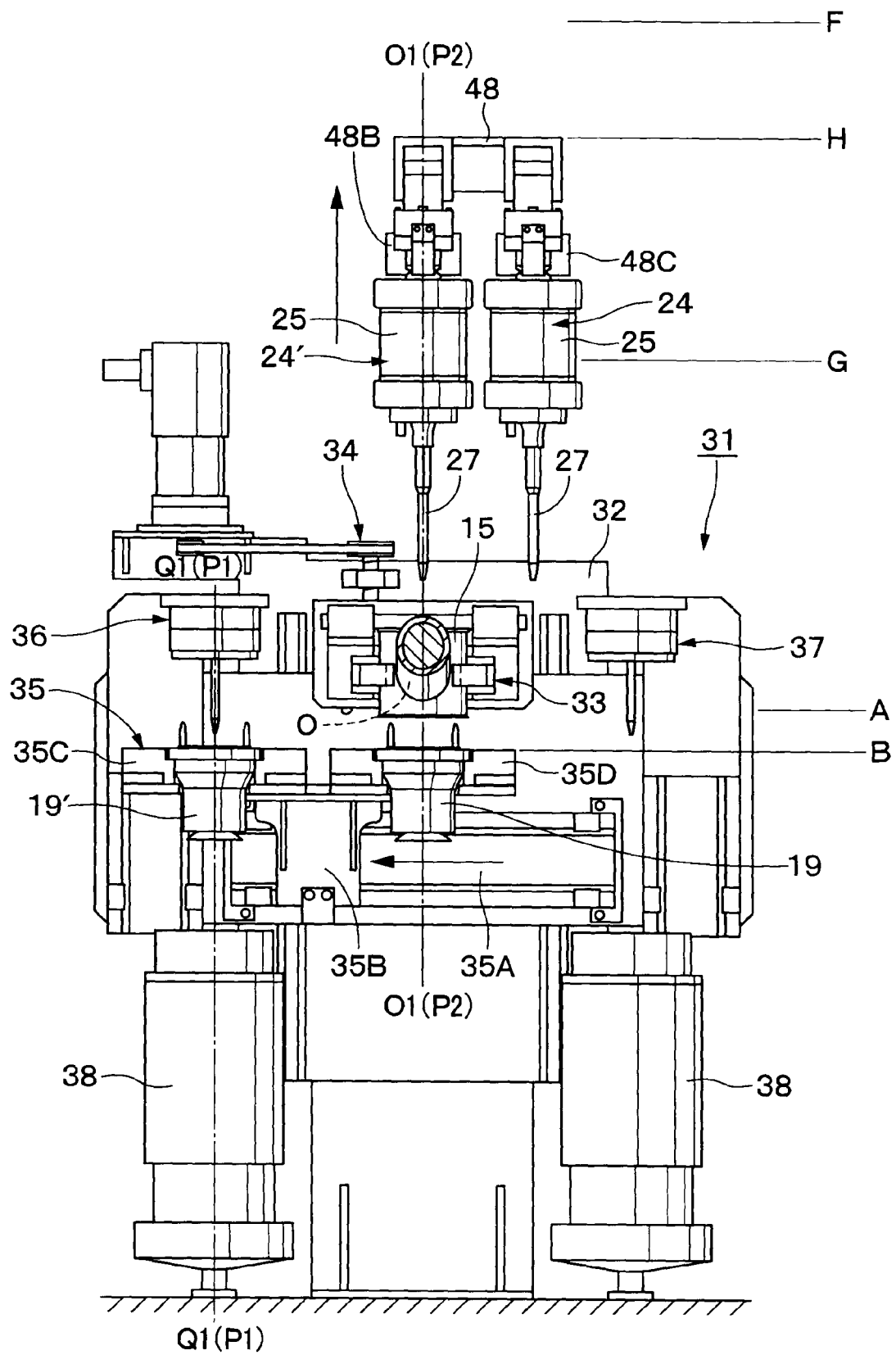
FIG. 33 is a schematic illustration explanatory of operational actions of moving an atomizing head gripper to the left, and detaching a used paint cartridge.

Further, when the atomizing head gripper 35 is lowered to position B as shown in FIG. 32, the atomizing head 19' can be dismantled from the common body 15. In position B, by means of the cylinder 35A, the atomizing head 19 on the gripping member 35C (35D) can be moved in a leftward direction along with the movable plate 35B as shown in FIG. 33.

In this instance, when the movable plate 35B is shifted in a rightward direction by the cylinder 35A, as shown in FIG. 32, the center line P1-P1 of the gripping member 35C on the left side is located on the center line O1-O1 passing through the changing position "O" of the common body gripper 33, while the center line P2-P2 of the gripping member 35D on the right side is located on a center line Q2-Q2 of a washer 37 on the right side. On the other hand, as shown in FIG. 33, when the movable plate 35B of the atomizing head gripper 35 is shifted in a leftward direction by the cylinder 35A, the center line P1-P1 of the gripping member 35C on the left side is located on a center line Q1-Q1 of a washer 36 on the left side, which will be described hereinafter, while the center line P2-P2 of the gripping member 35D on the right side is located on the center line O1-O1 passing through the changing position "O" of the common body gripper 33.

Figure 38:
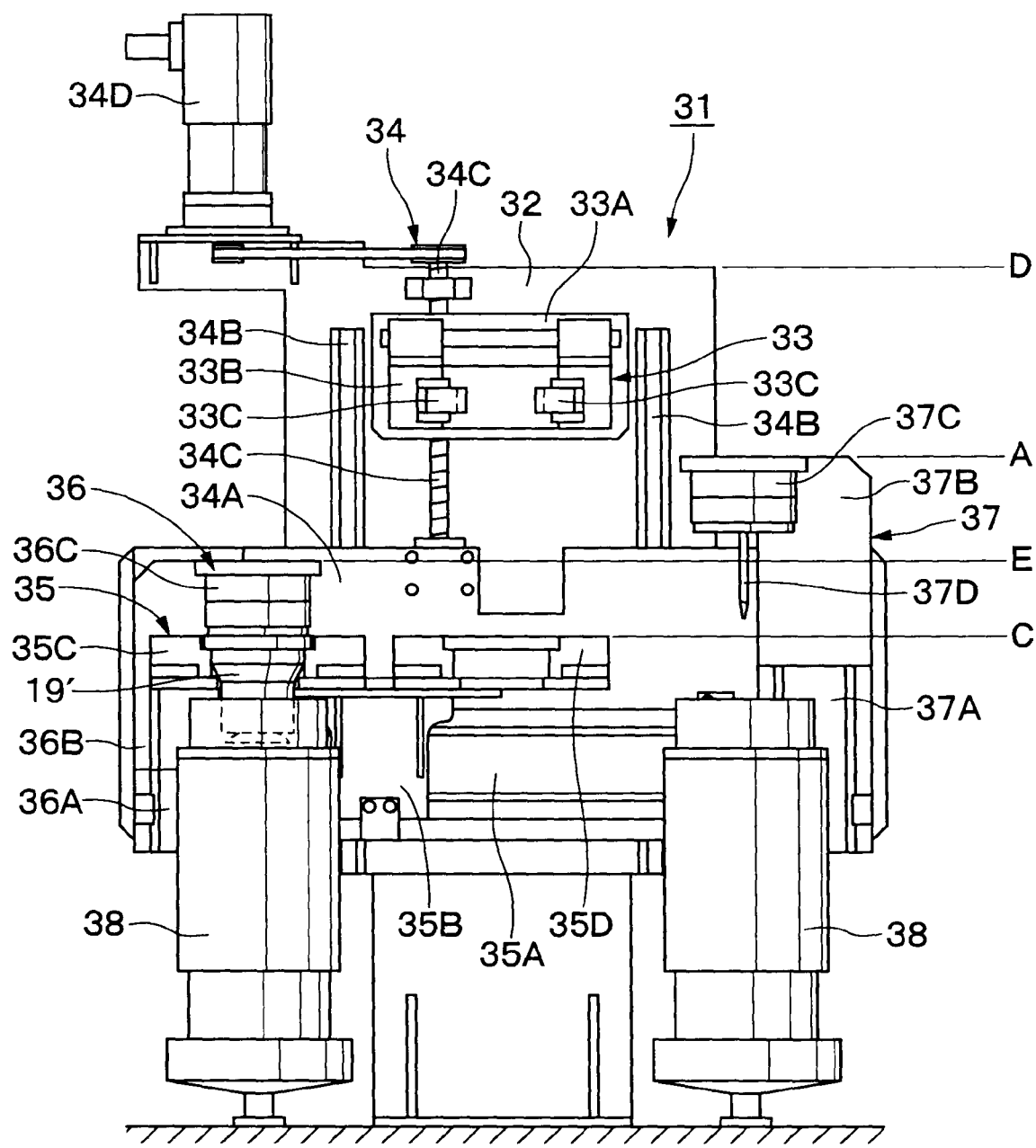
FIG. 38 is a schematic illustration explanatory of an operational action of washing a used atomizing head by a washer.

Further, as shown in FIG. 38, by lowering the atomizing head gripper 35 largely to position C, a used atomizing head 19' which is embraced in the gripping member 35C (35D) can be put in a waste liquid collecting container 38, which will be described hereinafter.

Figure 23:
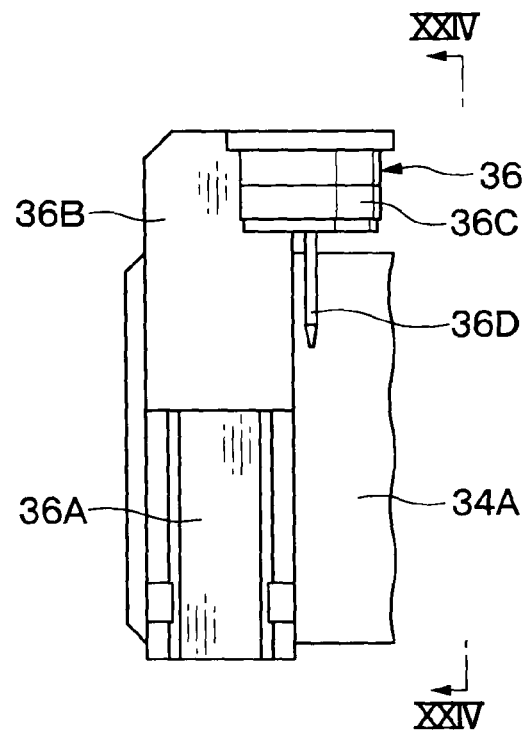
FIG. 23 is a front view of a washer which is located on the left side in FIG. 11.
Figure 24:
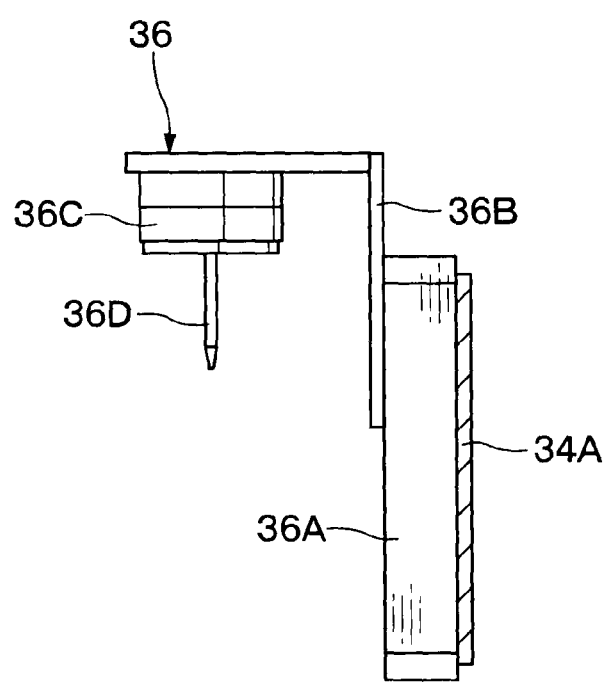
FIG. 24 is a right-hand side view of the washer, taken from the direction of arrows XXIV-XXIV of FIG. 23.

Indicated at 36 is a left washer which is mounted in a left position on the mount plate 34A of the elevator 34. The washer 36 is movable between upper and lower positions (between position D and position E) which will be described hereinafter. As shown in FIGS. 23 and 24, the washer 36 is largely constituted by a cylinder 36A vertically mounted on a left side portion of the mount plate 34A, a movable plate 36B substantially in the shape of a rectangular strip attached to the cylinder 36A for vertical movements, and a washing tool 36C located in a projected position on the front side of the movable plate 36B. In this instance, as the cylinder 36A, the washer 36 employs a rodless cylinder type actuator operated by pneumatic pressure or magnetic force.

Further, the washing tool 36C is provided with a wash liquid feed tube 36D for spurting a wash liquid toward the rotary atomizing head 22. In addition to a wash valve which opens and closes a passage in the wash liquid feed tube 36D, the washing tool 36C is further provided with a driving air passage for supply of compressed air to drive the air motor 21, and a shaping air passage for supply of shaping air (both not shown in the drawings). The washing tool 36C as well as the wash liquid feed tube 36D is located on the center line Q1-Q1.

On the other hand, indicated at 37 is a right side washer which is located in a right side position on the mount plate 34A of the elevator 34. This washer 37 is also movable between upper and lower positions (between position D and position E). In the same way as the washer 36 on the left side, the washer 37 on the right side is largely constituted by a cylinder 37A, a movable plate 37B, a washing tool 37C and a wash liquid feed tube 37D. The washing tool 37C as well as the wash liquid feed tube 37D is located on the center line Q2-Q2. Therefore, as shown in FIG. 13, the left washer 36 is at a distance W2 from the right washer 37.

As described above, the washing tools 36C and 37C of the washers 36 and 37 are movable to and from an upper lifted position D on the mount plate 34A (e.g., the position shown in FIG. 31) and a lowered position E in the proximity of the waste liquid collecting container 38 (e.g., the position shown in FIG. 38) by the cylinders 36A and 37A.

The washing tools 36C and 37C are in a standby state when in the upper lifted position D. When in the lowered position E, the wash liquid feed tube 36D or 37D of the washing tool 36C or 37C is inserted into a used atomizing head 19' to take a washing position. In this washing position, a wash liquid is spurted out from the washing liquid feed tube 36D or 37D to wash off paint which has deposited on the used atomizing head 19'.

Indicated at 38 are left and right waste liquid collecting containers which are located underneath the left and right washers 36 and 37, respectively. Each one of these waste liquid collecting container 38 is constituted by a bottomed cylindrical container which is located in a vertically aligned position relative to the washing tool 36C or 37C. Further, each one of the waste liquid collecting containers 38 serves to collect a waste wash liquid which is scattered around while an atomizing head 19 is washed by the washer 36 or 37. Each waste liquid collecting container 38 is internally provided with nozzles (not shown in the drawings) to spurt a wash liquid toward outer peripheral surfaces of the rotary atomizing head 22 and shaping air ring 23 and the like to wash off paint which has deposited on outer peripheral surfaces of the rotary atomizing head 22 and shaping air ring 23.

Now, following is a description of the construction of a cartridge changer 41 which is capable of interchangeably mounting a selected paint cartridge 24 on the common body 15 of the coater unit 14, which is provided on the robot device 13, with reference to FIGS. 8 to 10 and 25 to 29.

Figure 25:
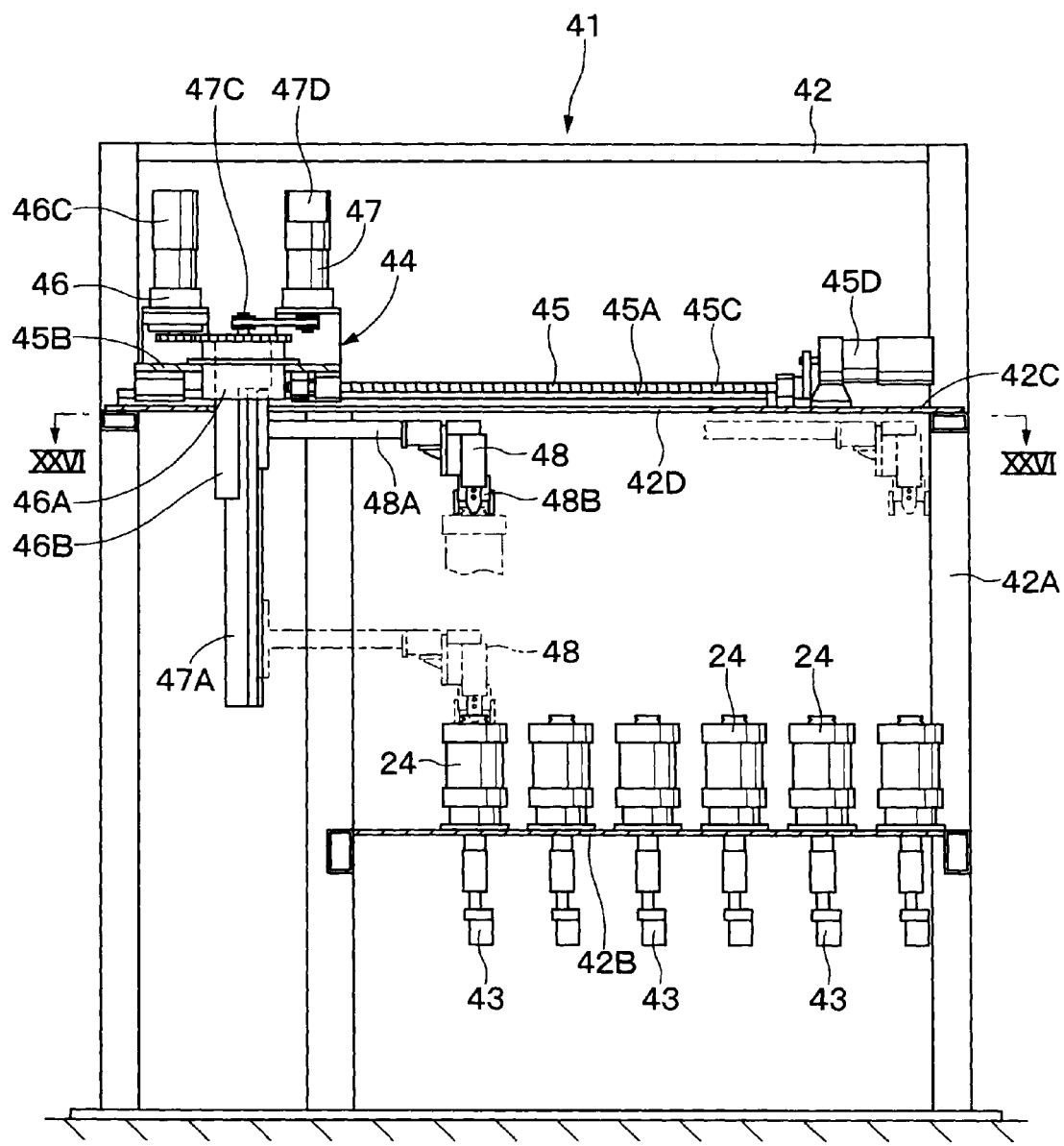
FIG. 25 is a sectional view of a cartridge changer, taken from the direction of arrows XXV-XXV of FIG. 10.
Figure 26:
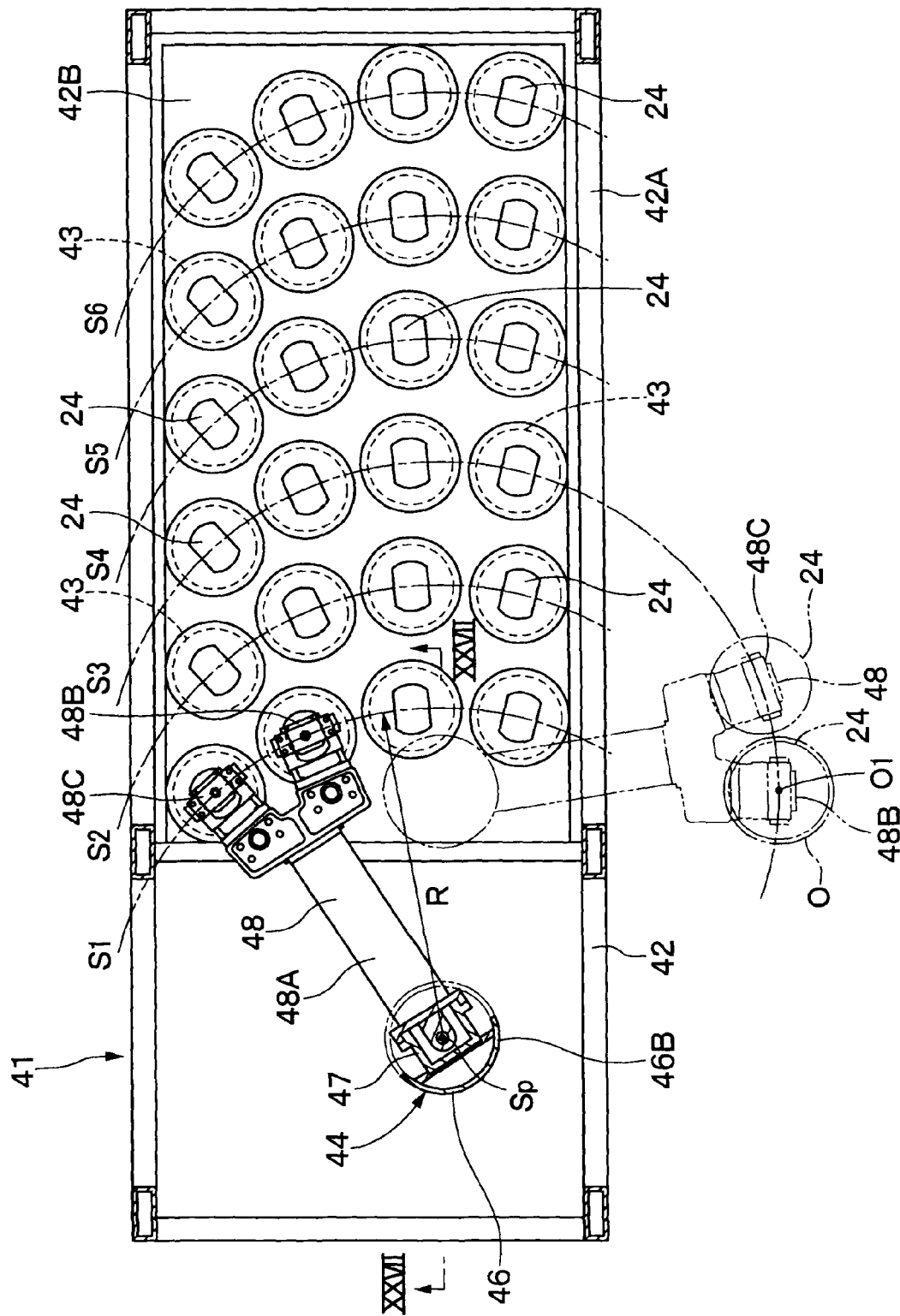
FIG. 26 is an enlarged sectional view of the cartridge changer, taken from the direction of arrows XXVI-XXVI of FIG. 25.

Namely, indicated at 41 is a cartridge changer which is located behind the atomizing head changing and washing device 31. This cartridge changer 41 serves to replace a used paint cartridge 24' on the common body 15 of the coater unit 14 by a fresh paint cartridge 24 which has been replenished with paint. As shown in FIGS. 25 and 26, the cartridge changer 41 is largely constituted by a mount deck 42, a paint replenishing unit 43 and a cartridge handler 44, as described below.

Denoted at 42 is a mount deck which constitutes a main body structure of the cartridge changer 41. This mount deck 42 is adapted to hold a plural number of paint cartridges side by side, and located within an operating range of a swing arm 48 which will be described hereinafter. In this instance, the mount deck 42 is constituted by a frame structure 42A built in a rectangular shape which is elongated in a transverse direction (in the transfer direction of the vehicle body 2), a rectangular shaped lower deck plate 42B which is supported substantially horizontally on the intermediate position closer to the bottom of the frame structure 42A, and a rectangular shaped upper deck plate 42C which is supported substantially horizontally on the intermediate position closer to the top of the frame structure 42A.

Figure 10:
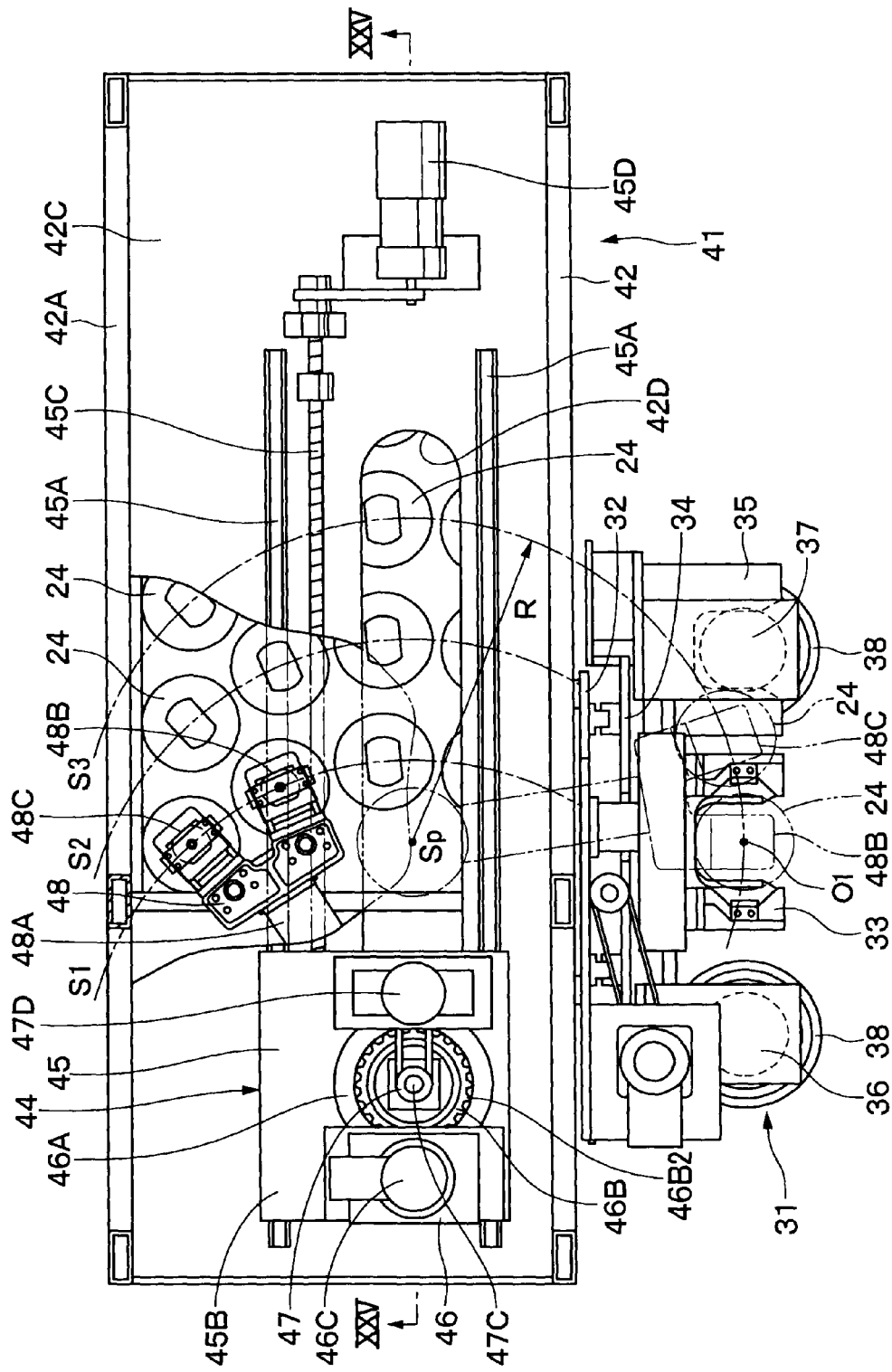
FIG. 10 is a partly cutaway plan view showing on an enlarged scale the atomizing head changing and washing device and the paint cartridge changer of FIG. 8.

As shown in FIG. 10, the upper deck plate 42C is formed with a transversely extending slot 42D at a position closer to its front side. This slot 42D is provided to permit linear leftward and rightward movements of a cylindrical swiveling column 46B of an arcuate moving portion 46, which will be described hereinafter. Further, the mount deck 42 is enclosed in a sheet-like decorative cover 42E composed by a thin plate (see FIGS. 1 and 2).

Indicated at 43 are a plural number of paint replenishing units (see FIGS. 25 and 26) which are mounted on the lower deck plate 42B of the mount deck 42. By one of these paint replenishing units 43, a used paint cartridge 24' is replenished with paint of a color same as a previous one. A suitable number of paint replenishing units 43 are provided depending upon the number of paint colors or types to be replenished. Furthermore, each one of the paint replenishing units 43 is connected to a paint source (which is not shown). A used paint cartridge 24' is set at the paint replenishing units 43 to insert a feed tube 27 from the top. In such a case, the paint chamber 25B of the tank 25 will be replenished through the paint supply passage 27A of the feed tube 27.

In this instance, as indicated by broken lines in FIG. 26, the plural number of paint replenishing units 43, for example, four units are located on the loci of arcuate line S drown by radius R about a pivoting point Sp of a swing arm 48 moved by arcuate moving portion 46. Furthermore, the paint replenishing units 43 are arranged in six arcuate rows S1 to S6 from left side to the right, for example, at uniform intervals in the longitudinal direction of the mount deck 42, each row having four replenishing units 43 located along an arcuate lines across the width (between the front and rear sides) of the mount deck 42.

Indicated at 44 is a cartridge handler which is provided on the mount deck 42. This cartridge handler 44 is a mechanism for transferring a used paint cartridge 24' or a replenished paint cartridge 24 along an arcuate transfer line to or from a paint replenishing unit 43 on the mount deck 42 and the common body 15 of the coater unit 14 located in the changing position "O". The cartridge handler 44 is constituted by a linear moving portion 45, an arcuate moving portion 46, a vertical moving portion 47 and a swing arm 48, which are described below.

Figure 27:
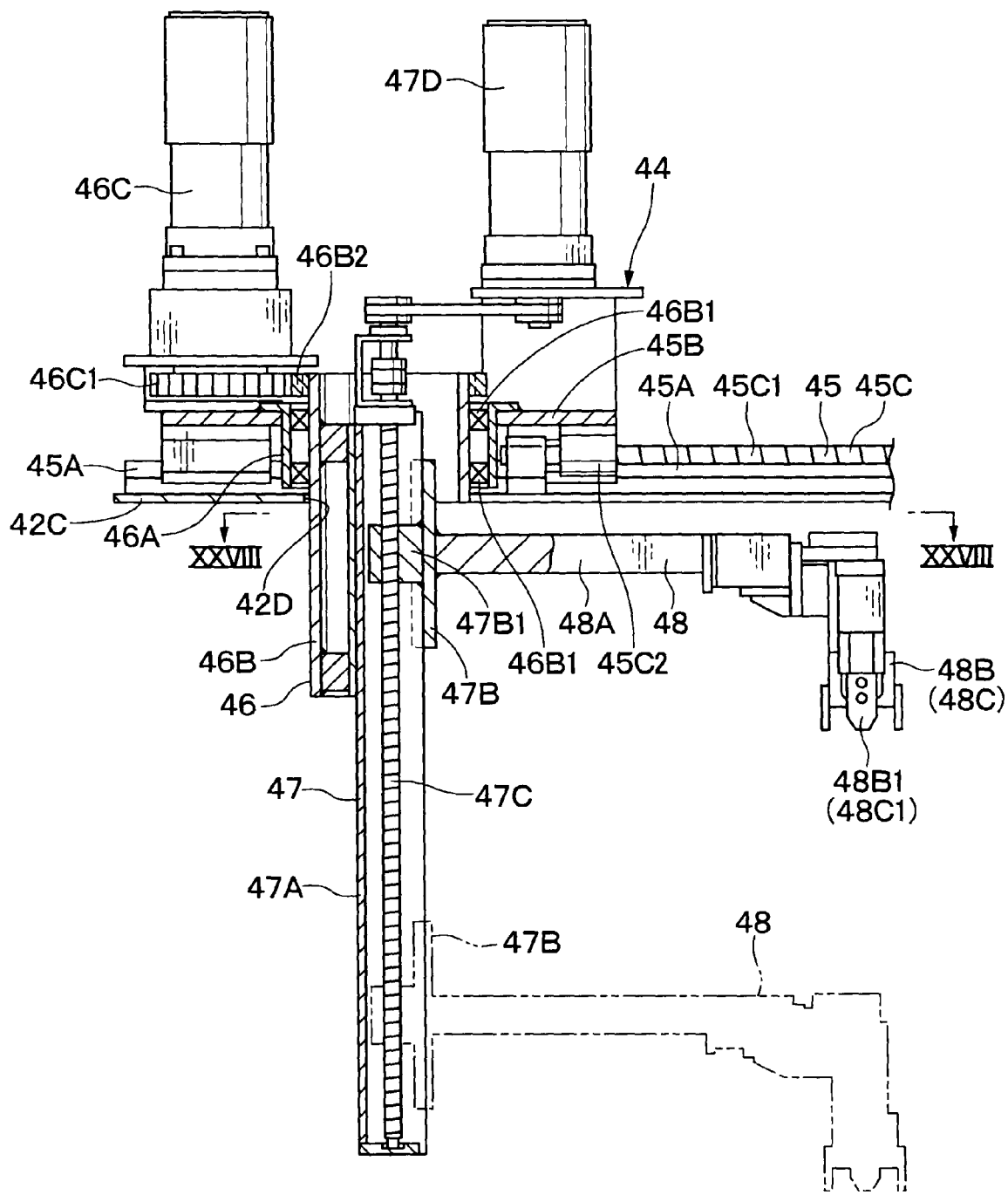
FIG. 27 is an enlarged sectional view of a cartridge handler, taken from the direction of arrows XXVII-XXVII of FIG. 26.

Indicated at 45 is a linear moving portion which is provided on the upper deck plate 42C of the mount deck 42. This linear moving portion 45 is operative to shift positions of an arcuate moving portion 46, a vertical moving portion 47 and a swing arm 48, which will be described hereinafter, linearly in the longitudinal direction of the mount deck 42. In this instance, as shown in FIGS. 10 and 25, the linear moving portion 45 is largely constituted by a pair of guide rails 45A which are located longitudinally on the opposite sides of the slot 42D in the upper deck plate 42C, a carriage 45B which is movably mounted on the guide rails 45A, a screw feeder 45C which is located between the guide rail 45A and the slot 42D and a motor 45D which is mounted on a right end portion of the upper deck plate 42C to drive the screw feeder 45C. As shown in FIG. 27, the screw feeder 45C is constituted by a screw rod 45C1, and a block 45C2 which is attached to the lower side of the carriage 45B, in threaded engagement with the screw rod 45C1.

Indicated at 46 is an arcuate moving portion which is mounted on the carriage 45B of the linear moving portion 45, the arcuate moving portion 46 turn (swing) a cartridge gripper 48B provided at the fore end along an arcuate path, by oscillating (revolving) a swing arm 48 which will be described hereinafter, in a horizontal plane upon pivoting point Sp. Further, as shown in FIG. 27, the arcuate moving portion 46 is largely constituted by a stationary cylindrical outer shell 46A which is fixedly provided substantially at the center of the carriage 45B, a swiveling column 46B rotatably fitted in the outer shell 46A for swiveling movements about a vertical axis, and a rotational drive motor 46C for turning the swiveling column 46B which is mounted on the carriage 45B.

In this instance, the swiveling column 46B is rotatably supported in the outer shell 46A through a bearing 46B1. A gear 46B2 is provided on the outer periphery of an upper end portion of the swiveling column 46B, in meshing engagement with a gear 46C1 on the part of the rotational drive motor 46C. As the rotational drive motor 46C is rotatably actuated, the swiveling column 46B is turned through the gears 46C1 and 46B2. Thus, the swing arm 48 can be turned (can be put in a swinging motion) by the arcuate moving portion 46 which is simple in construction.

Figure 28:
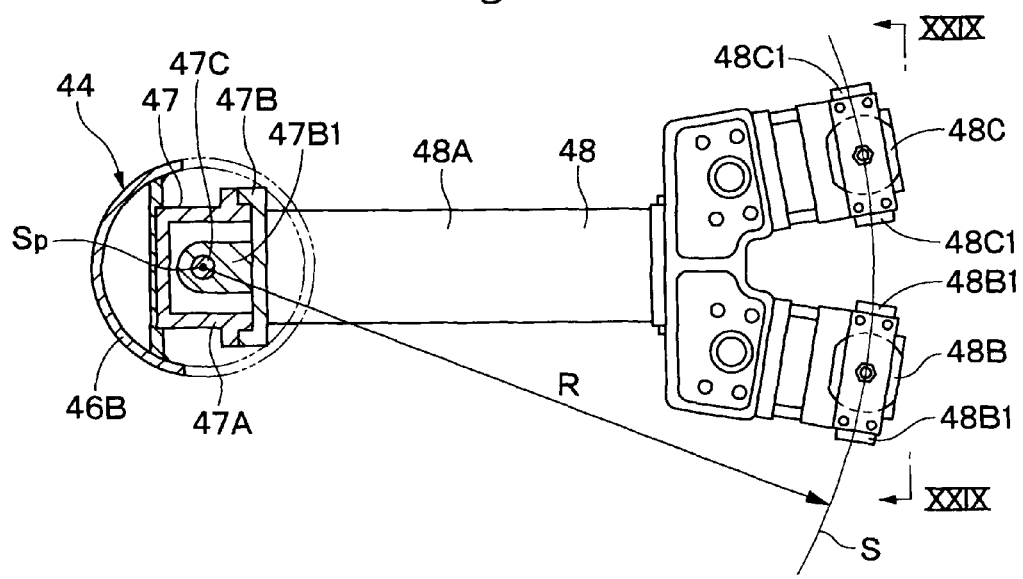
FIG. 28 is an enlarged sectional view of an arcuate moving portion, a vertical moving portion and a swing arm, taken from the direction of arrows XXVIII-XXVIII of FIG. 27.

Designated at 47 is a vertical moving portion which is attached to the swiveling column 46B of the arcuate moving portion 46. This vertical moving portion 47 is provided for lifting a swing arm 48 up and down (upward or downward shifts of arm position), which will be described hereinafter. Namely, as shown in FIGS. 27 and 28, the vertical moving portion 47 is largely constituted by a guide member 47A which is securely fixed to the inner periphery of the swiveling column 46B of the arcuate moving portion 46 and extended downward of the swiveling column 46B, a lifter block 47B which is vertically and movably mounted on the guide member 47A, a rod screw 47C which is extended vertically and rotatably within the guide member 47A and meshed with a threaded meshing member 47B1 of the lifter block 47B, and a motor 47D which is mounted on the carriage 45B of the linear moving portion 45 for rotationally driving the rod screw 47C. Further, an arm body proper 48A of a swing arm 48 is securely attached to the lifter block 47B.

Figure 29:
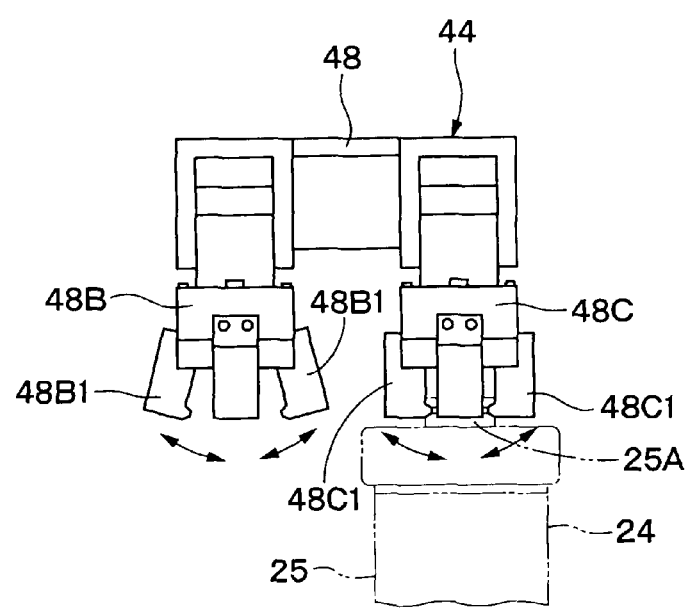
FIG. 29 is a right-hand side view of cartridge grippers on the swing arm, taken from the direction of arrows XXIX-XXIX of FIG. 28.

Indicated at 48 is a swing arm which is attached to the lifter block 47B of the vertical moving portion 47. This swing arm 48 is operative to pick up paint cartridges 24 which are arrayed on the upper deck plate 42C of the mount deck 42. As shown in FIGS. 28 and 29, the swing arm 48 is largely constituted by an arm body proper 48A which is horizontally extended from the lifter block 47B, and left and right cartridge grippers 48B and 48C which are provided side by side at a fore distal end of the arm body proper 48A.

The cartridge gripper 48B on the left side is provided with a pair of gripping pawls 48B1 which are turned toward and away from each other by means of an actuator (not shown). These gripping pawls 48B1 are turned toward each other at the time of catching a grip knob 25A which is provided on the tank 25 of a paint cartridge 24. Similarly, the cartridge gripper 48C on the right side is provided with paired gripping pawls 48C1 which can be likewise turned toward and away from each other by means of an actuator (not shown). In this instance, each one of the cartridge grippers 48B and 48C is located on an arc of radius R around the pivoting point Sp of the arcuate moving portion 46.

In this instance, the swing arm 48 of the cartridge handler 44 is linearly moved in a longitudinal direction (in a leftward or rightward direction of the mount deck 42) by the linear moving portion 45, and put in a swing motion (an arcuate movement) by the arcuate moving portion 46 simultaneously with a lift up or a lift down movement (an upward or downward movement) by the vertical moving portion 47. Thus, the cartridge handler 44 can pick up a replenished paint cartridge 24 from a replenishing unit 43 and transfer the same to a position on the vertical center line O1-O1 passing through the changing position "O" of the atomizing head changing and washing device 31. Also, the cartridge handler 44 can return a used paint cartridge 24' to the paint replenishing unit 43.

At this time, the cartridge gripper 48B of the swing arm 48 is lifted up to position F (shown in FIGS. 31 and 37), and lowered from position F to position G (shown in FIGS. 32 and 35) at the time of replacing a used paint cartridge 24' with a replenished paint cartridge 24 by an arcuate moving portion 46. On the other hand, for replacing a used paint cartridge 24' by a replenished paint cartridge 24, the cartridge gripper 48B can be stopped at the level of position H (shown in FIGS. 33 and 34) which is lower than position F, because there is no paint cartridge 24' which is in the way as an obstacle.

The above-described paint coating system 11 of the present embodiment is put in operation in the manner as follows.

In the first place, in order to paint a vehicle body 2 which is being transferred by the conveyer 3, the robot device 13 is moved on and along the tracking rail 12 while coating operation is put in action by the robot device 13. At this time, a washed clean atomizing head 19 is connected to the head coupler portion 15C of a common body 15, and a replenished paint cartridge 24 which is filled with a desired paint color is set in the cartridge holder portion 15D. Thus, a cartridge type rotary atomizing head type coater unit 14 is set up by the common body 15, atomizing head 19 and the paint cartridge 24.

In order to start a coating operation by the use of the coater unit 14, the robot device 13 is put in action to face the rotary atomizing head 22 of the atomizing head 19 toward the vehicle body 2. The rotary atomizing head 22 is put in high speed rotation by the air motor 21, while shaping air is spurted out from the shaping air ring 23. Further, a high voltage is applied to the rotary atomizing head 22 from the high voltage generator 16 through the air motor 21. In this state, the extruder liquid valve 18 and the paint valve 29 are opened, whereupon the paint in the tank 25 of the paint cartridge 24 is pushed out toward the rotary atomizing head 22 from the feed tube 27 by the action of the extruder liquid. As a consequence, paint particles which are charged with a high voltage are sprayed toward the vehicle body 2 by the rotary atomizing head 22.

Upon finishing a paint coating operation on the vehicle body 2, a used atomizing head 19' and a used paint cartridge 24' are replaced by a washed atomizing head 19 and a replenished paint cartridge 24.

Given below is a more detailed description of operations for replacement of the atomizing head 19 and the paint cartridge 24, with reference to the flow chart of FIG. 40 and to the schematic illustration explanatory of FIGS. 30 to 39.

As described above, upon finishing a coating operation on a vehicle body 2 by the coater unit 14 (Step 1), the robot device 13 is put in an action to bring the coater unit 14 to the changing position "O" of the atomizing head changing and washing device 31 as indicated in phantom in FIG. 30 (Step 2). At this changing position "O", the common body 15 of the coater unit 14 is located between each gripping pawls 33C at the common body gripper 33 of the atomizing head changing and washing device 31 as shown in two dot line in the figure. On the other hand, a used atomizing head 19' is located in a position within a reach of the left side of the gripping member 35C of the gripping members 35C, 35D of the atomizing head gripper 35 which is shown in FIG. 30.

In Step 3, a judgment is made as to whether or not the coater unit 14 has already reached the changing position "O" of the atomizing head changing and washing device 31. The control proceeds to Step 4 in case the coater unit 14 is found to have already been located in the changing position "O" of the atomizing head changing and washing device 31 as shown in two dot line in FIG. 30.

In Step 4, the robot device 13 is switched to a reduced power mode. In this case of the paint coating system 11, the coater unit 14 which should be located correctly at the changing position "O" might have been located in a deviated position for some reason. Therefore, in Step 4, the robot device 13 is put in a reduced power mode, lowering the levels of driving forces of rotating motors and reciprocating actuators (both not shown) which actuate the arms 13B and 13C and the wrist 13D of the robot device 13. That is, in Step 4, the robot device 13 is controlled to make the common body 15 freely movable by application of an external force to the coating unit 14. Thus, the coater unit 14 is put in a freely movable state.

In Step 5, as shown in FIG. 31, as soon as the coater unit 14 is delivered to the changing position "O" of the atomizing head changing and washing device 31 by the robot device 13, the mount portion 15B on the common body 15 of the coater unit 14 is gripped between the right and left gripping pawls 33C of the common body gripper 33. The coater unit 14 is put in a free state in Step 4 before gripping the common body 15 of the coater unit 14 by the right and left gripping pawls 33C of the common body gripper 33. Therefore, as the mount portion 15B of the common body 15 is gripped between the gripping pawls 33C, a positional deviation between the robot device 13 can be corrected automatically by the inclined surfaces 33C1 to set the mount portion 15B of the common body 15 exactly at the predetermined specific changing position "O" of the atomizing head changing and washing device 31.

In case the common body 15 is deviated in a rotational direction, such positional deviation in a rotational direction can also be automatically corrected as the flat surfaces 15F1 of the grip surfaces 15F provided at the mount portion 15B are gripped between the flat surfaces 33D1 of the radial positioners 33D. Accordingly, as shown in FIG. 31, by the common body gripper 33, the common body 15 can be fixed in a predetermined specific changing position "O" on the center line O1-O1 in between the gripping pawls 33C, in a correctly oriented state in radial direction and exactly at a predetermined height.

In this instance, Step 4 for switching the coater unit 14 provided at the robot device 13 to a freely movable state and Step 5 for gripping the common body 15 of the coater unit 14 are executed substantially at the same time. If necessary, the order of Step 4 and Step 5 may be reversed, putting the common body 15 on the robot device 13 in a free state after the common body 15 of the coater unit 14 is gripped.

While Step 4 and Step 5 are being executed, the cartridge changer 41 is put in operation. Namely, as shown in FIG. 31, the cartridge changer 41 is put in operation to grip a replenished paint cartridge 24 by the right cartridge gripper 48C of the left and right cartridge grippers 48B and 48C of the swing arm 48 of the cartridge changer 41, followed by a movement of the cartridge gripper 48C toward the atomizing head changing and washing device 31. At this time, the replenished paint cartridge 24 is transferred at a high level position F to keep the feed tube 27 of the cartridge 24 clear of any obstacle, and the other free cartridge gripper 48B on the left side is located in a position above the changing position "O" and on the center line O1-O1 by the vertical moving portion 47.

Now, in Step 6, as shown in FIG. 32, the atomizing head gripper 35 is put in an action of gripping a used atomizing head 19' by the gripping member 35C, followed by an action of lowering the atomizing head gripper 35 to the position B to dismantle the used atomizing head 19' from the common body 15. Further, in Step 7, the swing arm 48 is lowered to the position G to grip a used paint cartridge 24' by the left cartridge gripper 48B. Then, as shown in FIG. 33, the swing arm 48 is lifted up to the position H by the vertical moving portion 47 to draw the used paint cartridge 24' out of the common body 15.

In this instance, Step 6 for dismantling a used atomizing head 19' from the common body 15 and Step 7 for unloading a used paint cartridge 24' from the common body 15 may be reversed in order, or may be executed simultaneously.

Now, as soon as the feed tube 27 of the paint cartridge 24' is extracted out of the atomizing head 19', the used atomizing head 19' which is gripped on the gripping member 35C on the left side is moved by the cylinder 35A as far as a position on the center line Q1-Q1 of the washer 36 on the left side, while the washed clean atomizing head 19 which is gripped on the gripping member 35D on the right side is shifted to a position on the center line O1-O1 and below the changing position "O", as shown in FIG. 33.

Figure 34:
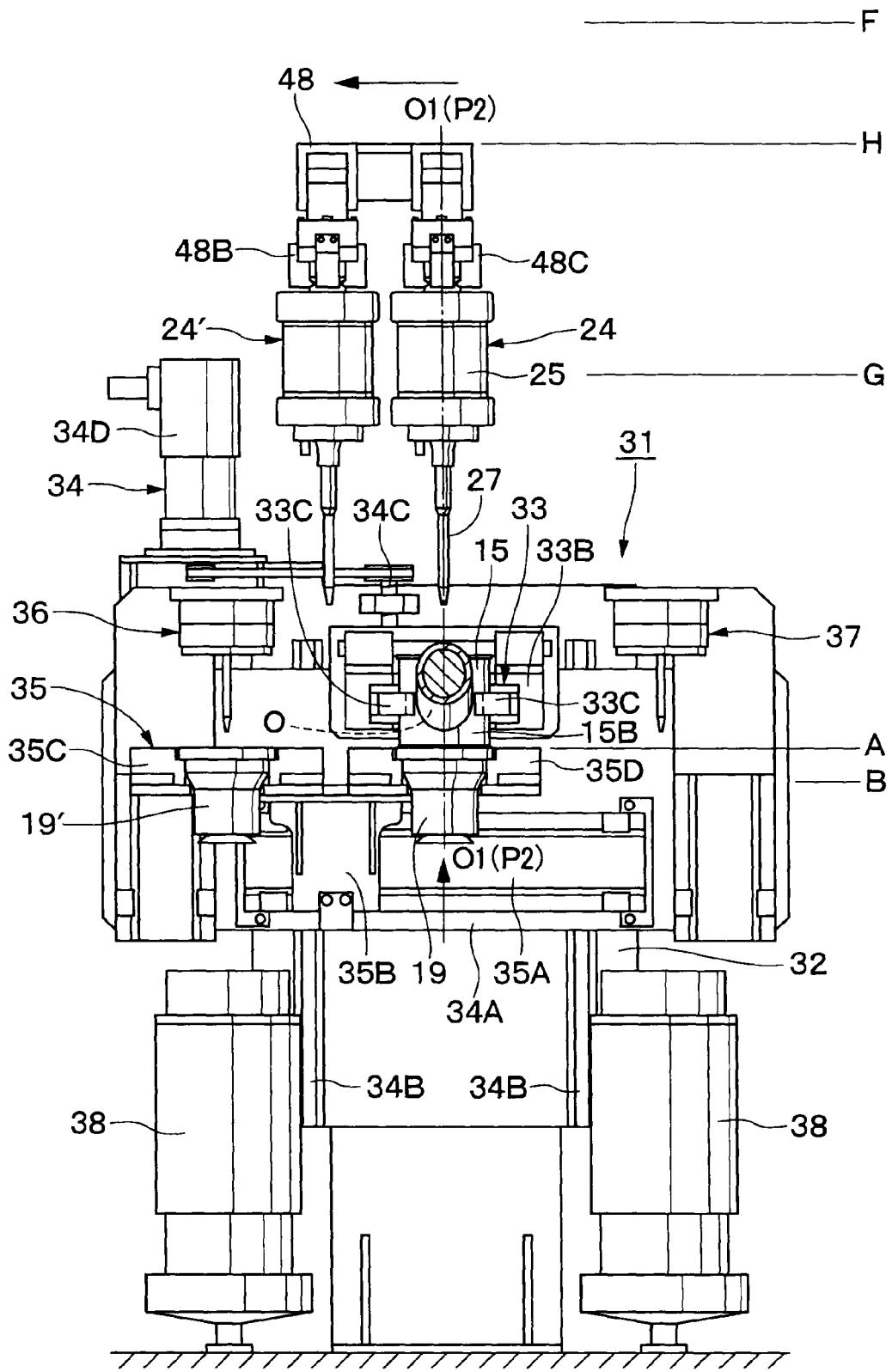
FIG. 34 is a schematic illustration explanatory of operational actions of mounting a washed atomizing head on a common body, and placing a replenished paint cartridge in a changing position.

Now, in Step 8, as shown in FIG. 34, the gripping member 35D of the atomizing head gripper 35 is lifted up to position A to mount the washed clean atomizing head 19 which is gripped by the gripping member 35D on the common body 15. On the other hand, the cartridge grippers 48B and 48C of the swing arm 48 are moved to the left side to relocate the replenished paint cartridge 24 gripped by the right cartridge gripper 48C in a position on the center line O1-O1 and above the changing position "O". At this time, by the vertical moving portion 47, the cartridge grippers 48B and 48C are lifted up to position H which is at a lower level than position F, shortening time which is required for shifting the position.

Figure 35:
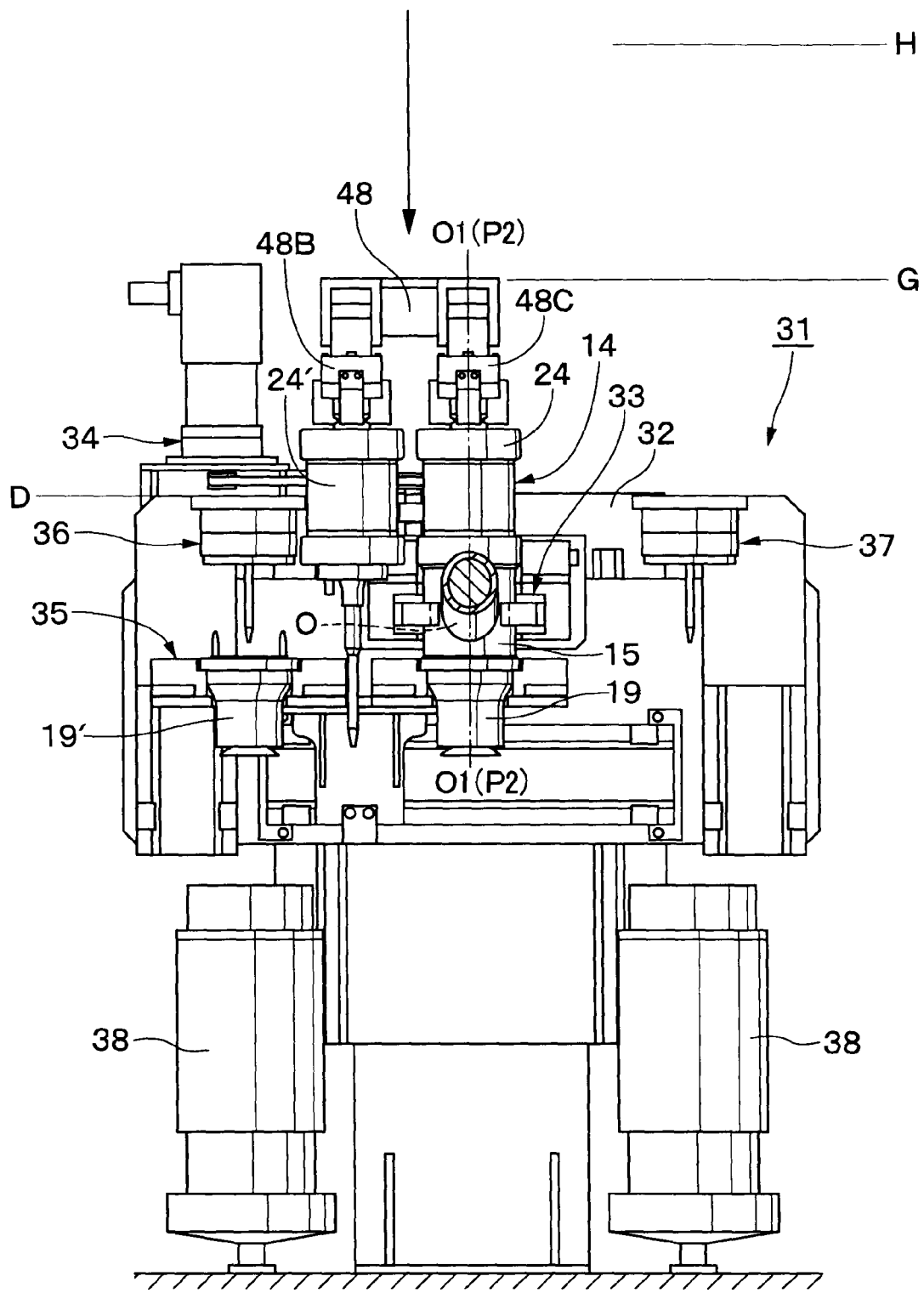
FIG. 35 is a schematic illustration explanatory of an operational action of mounting a replenished paint cartridge on a common body.
Figure 36:
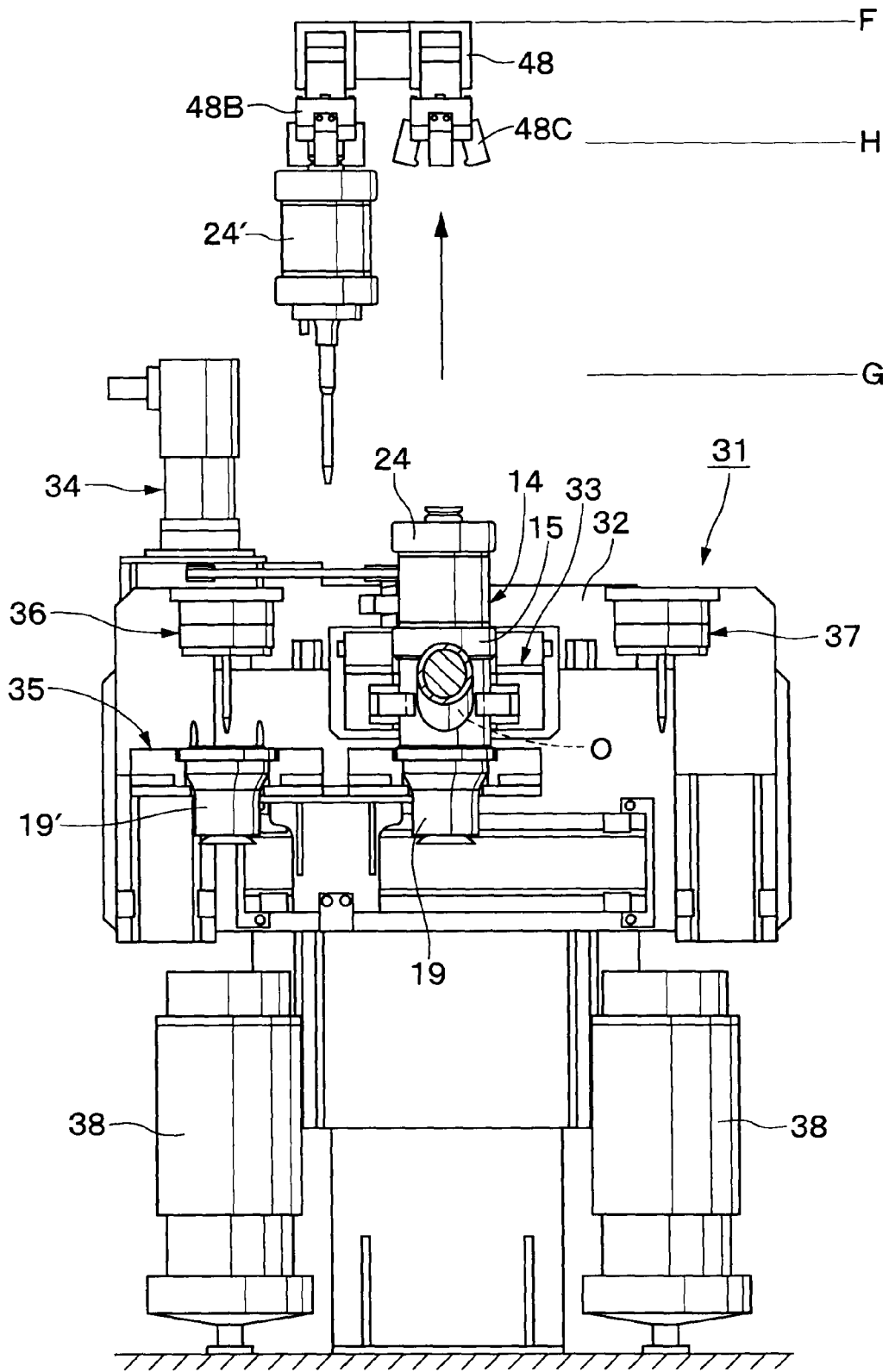
FIG. 36 is a schematic illustration explanatory of an operational action, showing the swing arm which has been moved to an upper position.

Now, the control goes to Step 9 as soon as the replenished paint cartridge 24 is located in a position over the changing position "O". In Step 9, as shown in FIG. 35, the cartridge gripper 48C is lowered to position G to load the replenished paint cartridge 24 into the common body 15. Thereafter, as shown in FIG. 36, the paint cartridge 24 is released from the cartridge gripper 48C as the latter is lifted up to position F.

Similarly to above-described Step 6 and Step 7, if desired, Step 8 for mounting a washed clean atomizing head 19 on the common body 15 and Step 9 for loading a replenished paint cartridge 24 on the common body 15 may be reversed in order or executed simultaneously.

Figure 37:
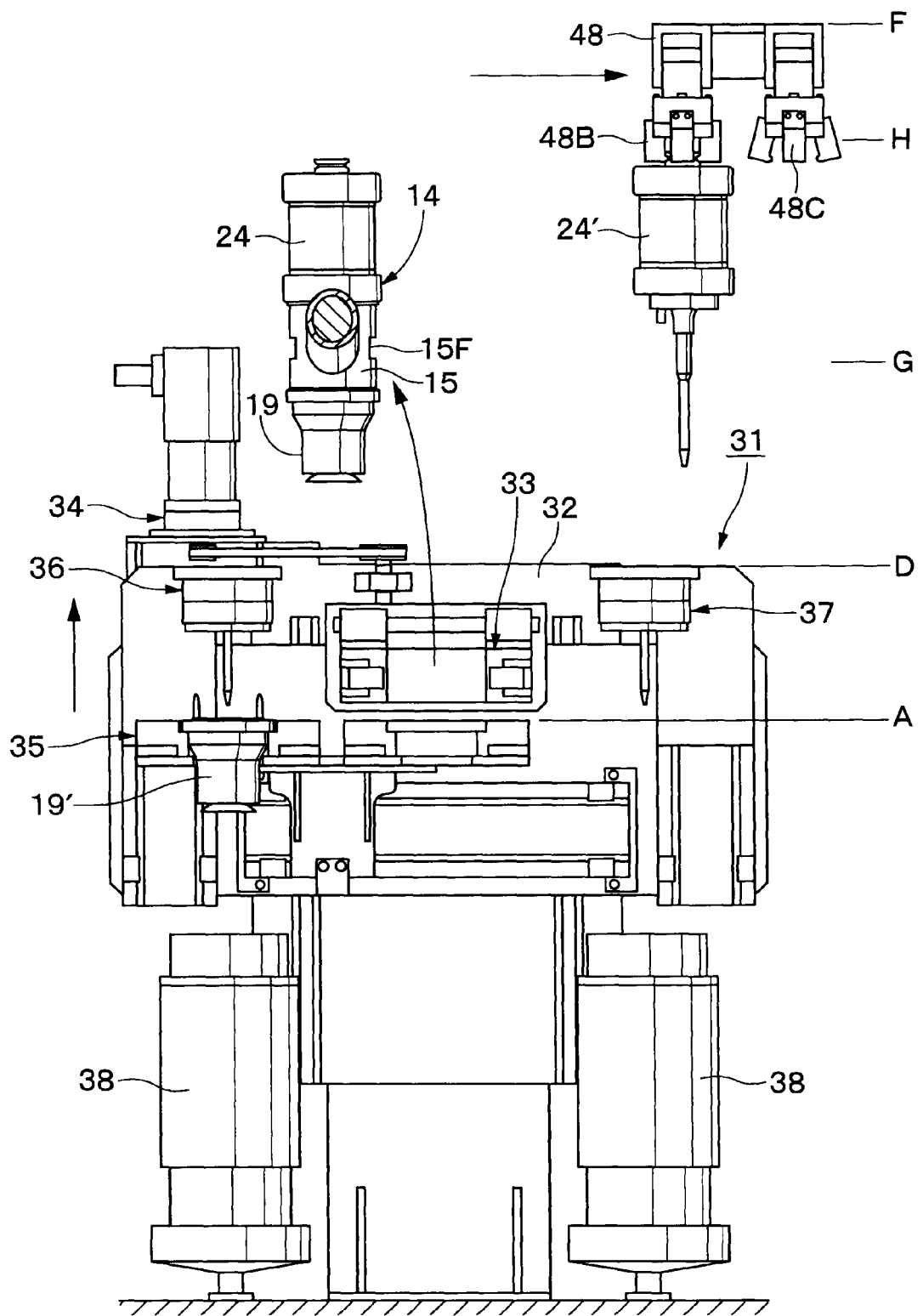
FIG. 37 is a schematic illustration explanatory of operational actions of moving a coater unit to a standby position for coating operation, and moving a used paint cartridge to a cartridge changer.

As soon as the coater unit 14 becomes ready for a next coating operation by replacing a washed clean atomizing head 19 and a replenished paint cartridge 24 on the common body 15, the control goes to Step 10 to cancel the reduced power mode of the device force for the robot device 13. In Step 10, in addition to cancellation of the reduced power mode, the gripping force of the common body gripper 33 as well as that of the atomizing head gripper 35 is canceled to release the atomizing head 19. In this state, as shown in FIG. 37, the swing arm 48 which carries the used paint cartridge 24' is moved toward the mount deck 42 of the cartridge changer 41. At the same time, the robot device 13 which is now controlled in a normal drive mode is moved to put the coater unit 14 in a coating standby position on the side of a vehicle body 2.

On the other hand, in Step 11, as shown in FIG. 38, the atomizing head gripper 35 is lowered to position C by the elevator 34 to put a fore end portion of the used atomizing head 19' in the waste liquid collecting container 38. Further, the washing tool 36C of the left washer 36 is lowered to position E to insert the wash liquid tube 36D in the used atomizing head 19'. In this state, a wash liquid is spurted out from the wash liquid tube 36D of the washer 36 to wash the rotary atomizing head 22 without scattering around splashes of the wash liquid.

Figure 39:
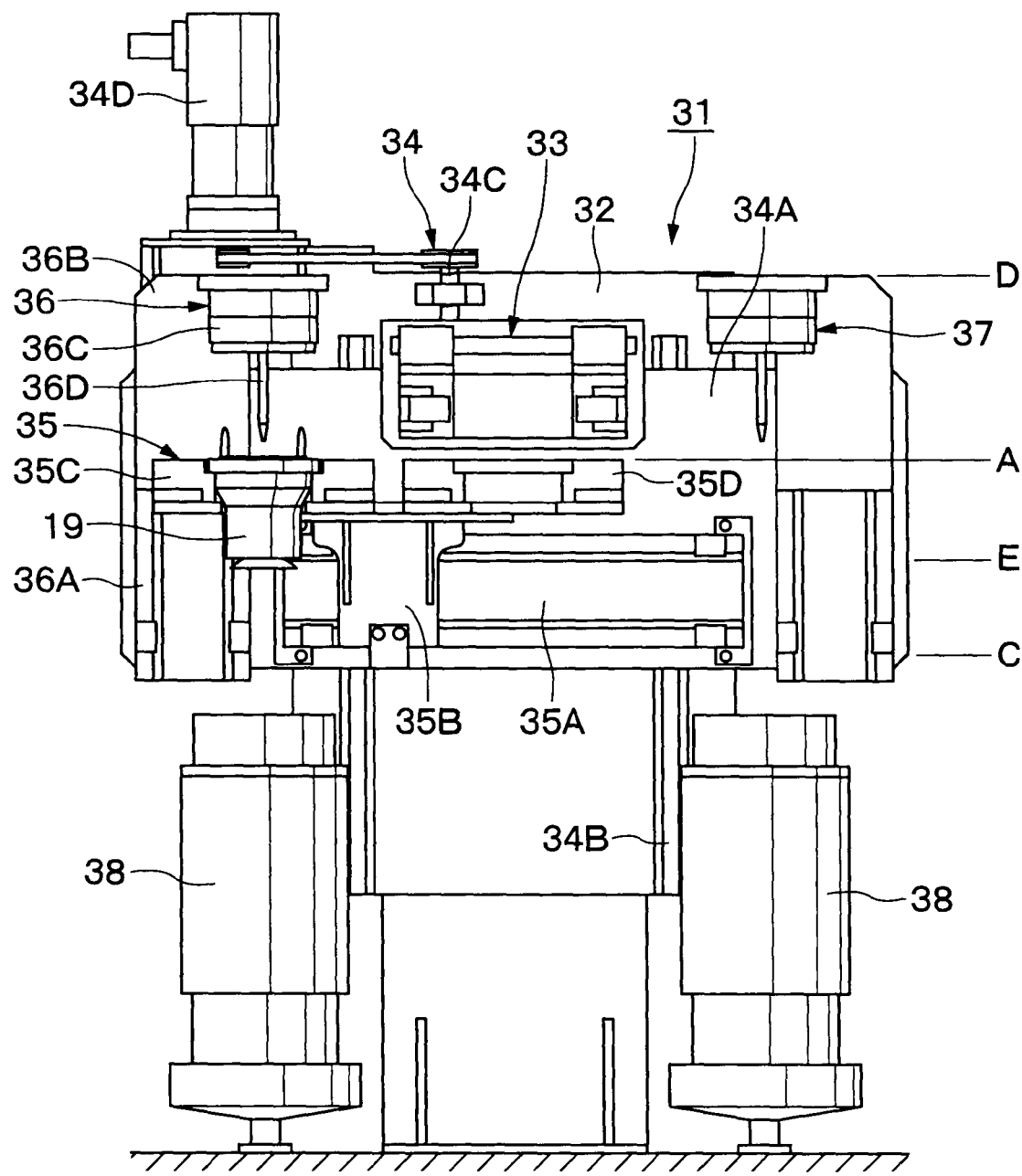
FIG. 39 is a schematic illustration explanatory of an operational action of holding a washed atomizing head in a standby state for a replacing operation.

Upon finishing a washing operation on the atomizing head 19, as shown in FIG. 39, the atomizing head gripper 35 is elevated to position A, and the washer 36 is elevated to position D. Accordingly, it is possible to stand by for the next operation for exchanging the atomizing head 19, 19' and the paint cartridge 24, 24'.

As described above, according to the present embodiment, the common body gripper 33 is mounted on the fixed plate 32 of the atomizing head changing and washing device 31, thereby fixedly gripping a common body 15 of a coater unit 14 in a predetermined position at the time of replacing an atomizing head 19 and a paint cartridge 24. Therefore, a common body 15 can be fixedly retained in position by the common body gripper 33 while replacing an atomizing head 19 and a paint cartridge 24 on the common body 15 of the coater unit 14. Thus, the common body gripper 33 is so arranged to locate a common body 15 in a predetermined changing position "O" of the atomizing head changing and washing device 31.

That is, according to the present embodiment, the common body gripper 33 is adapted to absorb positional deviations which might occur depending upon repeated positioning accuracy of the arms 13B and 13C of the robot device 13, as well as positional deviations which might have occurred in the course of installation of the robot device 13, the atomizing head changing and washing device 31 and the cartridge changer 41. It follows that the coater unit 14 can be located exactly in the predetermined immovable changing position "O" each time when replacing the atomizing head 19 and the paint cartridge 24.

Since a common body 15 is accurately located at a predetermined changing position "O" of the atomizing head changing and washing device 31, an atomizing head 19 and a paint cartridge 24 can be attached to or detached very smoothly without necessitating forcible actions. Thus, it contributes to suppress abrasion and bruises of the common body 15, atomizing head 19 and paint cartridge 24 to guarantee higher durability and reliability, while permitting a reduction in maintenance cost of the coating line 1.

Further, the accuracy in locating a common body 15 of a coater unit 14 exactly at a predetermined changing position "O" of the atomizing head changing and washing device 31 permits to carry out an installation work for the robot device 13 in a more efficient and facilitated manner, and to fabricate and install the atomizing head changing and washing device 31 and the cartridge changer 41. Furthermore, it is possible to allow a significant reduction in cost of the coating line 1 as a whole.

Further, since the common body gripper 33 is mounted in a fixed state on the fixed plate 32, the common body 15 can be gripped in the same position every time. That is to say, the atomizing head changing and washing device 31 as well as the paint cartridge changer 41 can smoothly mount or dismantle an atomizing head 19 or a paint cartridge 24 on or from the common body 15 which is located exactly in a predetermined position.

On the other hand, according to the present embodiment, when the common body 15 is gripped by the common body gripper 33, the robot device 13 is controlled in a reduced power mode in which driving forces (driving torques) of the robot arms 13B and 13C and wrist 13D are cut down to a low level, permitting to move the common body 15 freely by application of an external force. Thus, the coater unit 14 which is mounted on the wrist 13D is now, so to say, in a free state and can be moved in an arbitrary direction by an external force. Accordingly, in case there is a positional deviation between the coater unit 14 and the common body gripper 33, the coater unit 14 can be located accurately at the changing position "O" without being affected or obstructed by the driving force of the robot device 13.

Besides, the grip surfaces 15F are provided on the common body 15. On the other hand, paired gripping pawls 33C are provided on the part of the common body gripper 33 for gripping and locating the common body 15 at the changing position "O", in combination with the radial positioners 33D which are provided on the gripping pawls 33C and brought into abutting engagement with the grip surfaces 15F of the common body 15 to grip the common body 15 in position in a radial direction and in a vertical direction as well.

Thus, by the common body gripper 33, the common body 15 of the coater unit 14 can be automatically located in a predetermined specific changing position "O" accurately in both vertical and radial directions. As a result, an atomizing head 19 and a paint cartridge 24 can be smoothly mounted on or dismantled from the common body 15 without applying forcible connecting and disconnecting actions to guarantee higher reliability and elongated service life.

In addition, the cartridge changer 41 is simple in construction but capable of transferring a paint cartridge 24 to and from the changing position "O" efficiently by adoption of the swing arm 48 which is put in a swinging motion by the arcuate moving portion 46 and at the same time put in a linear movement in the longitudinal direction (in rightward and leftward direction) of the mount deck 42 by the linear moving portion 45. It follows that the mechanism for transferring paint cartridges 24 can be downsized to a compact form as compared with a case resorting to an exclusive cartridge handler robot or a transfer mechanism with an XY table and the like, permitting to install the paint coating system 11 even in a space which has thus far been considered too small or too narrow for installation.

Furthermore, according to the present embodiment, the cartridge changer 41 is composed of the linear moving portion 45 for transferring the swing arm 48 linearly in the longitudinal direction (in the rightward or leftward direction) of the mount deck 42, the arcuate moving portion 46 for putting the swing arm 48 in a swinging motion (an arcuate oscillatory movement) in a horizontal plane, the vertical moving portion 47 for lifting the swing arm 48 vertically in an upward or downward direction (lift up or down), and the swing arm 48 securely attached to the vertical moving portion 47 for gripping paint cartridges 24. Thus, the cartridge grippers 48B and 48C which are provided on the swing arm 48 can be moved both in the longitudinal direction (in the leftward or rightward direction) and in the transverse direction (in the forward or backward direction) of the cartridge mount deck 42 by the arcuate moving portion 46.

Consequently, as compared with a cartridge changing mechanism using a robot or an XY table and the like, for example, the cartridge changer 41 is simplified in construction as a whole by using an arcuate moving portion 46. Besides, even if the paint cartridges 24 on the mount deck 42 are increased in number, it is possible to cope with an increased number of paint cartridges 24 simply by extending the guide rail 45A of the linear moving portion 45.

In the above-described embodiment, by way of example the fixed plate 32 of the atomizing head changing and washing device 31 is securely fixed to the mount deck 42 of the cartridge changer 41. However, needless to say, the present invention is not limited to this particular example shown. The fixed plate 32 may be provided independently and separately of the mount deck 42 of the cartridge changer 41 as long as it is located within a reach of the cartridge grippers 48B and 48C on the swing arm 48.

Furthermore, in the above-described embodiment, the atomizing head 19 is shown as an atomizing head of rotary atomizing head type which provides a rotary atomizing head 22. However, the present invention is not limited to this particular type and can be applied to atomizing heads of other types, for example, to an atomizing head with pneumatic or hydraulic atomization nozzles.

The invention claimed is:

1. A paint coating system, comprising:
a robot device operative to take coating actions;
a coater unit having a common body fixedly mounted on said robot device and an atomizing head replaceably attached to said common body for spraying atomized paint particles;
a paint cartridge replaceably attached to said common body of said coater unit to supply paint to said atomizing head;
an atomizing head changing and washing device arranged and configured to replace a used atomizing head on said common body of said coater unit by a washed clean atomizing head and to wash said dismantled used atomizing head clean;
a cartridge changer arranged and configured to pick up a selected paint cartridge among a plural number of replenished paint cartridges arrayed on a mount deck, and to replace a used paint cartridge on said common body of said coater unit in a changing position of said atomizing head changing and washing device; and
a common body gripper provided at said atomizing head changing and washing device, and arranged and configured to releasably grip said common body of said coater unit after a transfer by said robot device to said changing position of said atomizing head changing and washing device, and to locate said common body exactly at said changing position.

2. A paint coating system as defined in claim 1, wherein said common body gripper is fixedly mounted on said atomizing head changing and washing device within an operating range of said robot device.

3. A paint coating system as defined in claim 1, wherein said atomizing head changing and washing device comprises a fixed member located adjacently to said cartridge changer, wherein said common body gripper is mounted on said fixed member, and arranged and configured to grip said common body at said changing position, further comprising an atomizing head gripper located under said common body gripper, movably in both vertical and lateral directions, and arranged and configured to attach or detach said atomizing head, and washers provided movably in a vertical direction at one side of said common body gripper to wash clean said used atomizing head gripped on said atomizing head gripper.

4. A paint coating system as defined in claim 3, wherein said atomizing head gripper and said washers are moved up and down together by means of an elevator provided on said fixed member.

5. A paint coating system as defined in claim 1, wherein said robot device is controlled in a reduced power mode in driving force at the time when said common body of said coater unit is gripped by said common body gripper, setting said common body in a free state.

6. A paint coating system as defined in claim 1, wherein said common body of said coater unit is provided with grip portions to be used in adjusting a position of the common body in a rotational direction, while said common body gripper is arranged to adjust said common body in a rotational direction by engagement with said grip portions at the time of gripping said common body.

7. A paint coating system as defined in claim 1, wherein said cartridge changer comprises a swing arm arranged and configured to swing arcuately about a swing arm pivoting point to and from an array of said replenished paint cartridges on a cartridge mount deck and said changing position of said atomizing head changing and washing device, for replacing paint cartridges.

8. A paint coating system as defined in claim 7, wherein said cartridge changer is composed of said mount deck arranged and configured to mount said replenished paint cartridges located in arcuate rows about said swing arm pivoting point, an arcuate moving portion provided on said mount deck and circulated to and fro about said pivoting point, a vertical moving portion provided on said arcuate moving portion for vertical upward and downward movements, and said swing arm, which extends in a horizontal plane attached to said vertical moving portion at a base end and provided with cartridge grippers at and on a fore free end thereof.

9. A paint coating system, comprising:
a robot device operative to take coating actions;
a coater unit having a common body fixedly mounted on said robot device and an atomizing head replaceably attached to said common body for spraying atomized paint particles;
a paint cartridge replaceably attached to said common body of said coater unit to supply paint to said atomizing head;
an atomizing head changing and washing device arranged and configured to replace a used atomizing head on said common body of said coater unit by a washed atomizing head and to wash said dismantled used atomizing head;
a cartridge changer arranged and configured to pick up a selected paint cartridge among a plural number of replenished paint cartridges arrayed on a mount deck, and to replace a used paint cartridge on said common body of said coater unit in a changing position of said atomizing head changing and washing device; and
common body gripper means provided at said atomizing head changing and washing device for releasably gripping said common body of said coater unit after a transfer by said robot device to said changing position of said atomizing head changing and washing device, to locate said common body exactly at said changing position.

10. A paint coating system, comprising:
a robot device operative to take coating actions;
a coater unit having a common body fixedly mounted on said robot device and an atomizing head replaceably attached to said common body for spraying atomized paint particles;
an atomizing head changing and washing device arranged and configured to replace a used atomizing head on said common body of said coater unit by a washed atomizing head and to wash said dismantled used atomizing head;
a cartridge changer arranged and configured to pick up a selected paint cartridge among a plural number of paint cartridges arrayed on a mount deck, and to place the selected paint cartridge on said common body of said coater unit in a changing position of said atomizing head changing and washing device, to supply paint to said atomizing head; and
common body gripper means provided at said atomizing head changing and washing device for releasably gripping said common body of said coater unit after a transfer by said robot device to said changing position of said atomizing head changing and washing device, to locate said common body exactly at said changing position.

* * * * *